US 9,677,199 B2

United States Patent
Morin

(10) Patent No.: US 9,677,199 B2
(45) Date of Patent: Jun. 13, 2017

(54) HIGH MODULUS POLYOLEFIN FIBERS EXHIBITING UNIQUE MICROSTRUCTURAL FEATURES

(71) Applicant: Innegra Technologies, LLC, Greenville, SC (US)

(72) Inventor: Brian G. Morin, Greenville, SC (US)

(73) Assignee: Innegrity, LLC, Greenville, SC (US)

( * ) Notice: Subject to any disclaimer, the term of this patent is extended or adjusted under 35 U.S.C. 154(b) by 134 days.

(21) Appl. No.: 13/947,912

(22) Filed: Jul. 22, 2013

(65) Prior Publication Data
US 2013/0302608 A1    Nov. 14, 2013

Related U.S. Application Data

(60) Continuation of application No. 12/610,007, filed on Oct. 30, 2009, now abandoned, which is a (Continued)

(51) Int. Cl.
*D02G 3/22* (2006.01)
*D01D 5/098* (2006.01)
(Continued)

(52) U.S. Cl.
CPC .............. *D02G 3/22* (2013.01); *D01D 5/0885* (2013.01); *D01D 5/098* (2013.01); *D01F 1/10* (2013.01);
(Continued)

(58) Field of Classification Search
CPC ..... C04B 16/0633; C04B 28/02; C04B 28/14; C04B 14/386; C04B 14/42; C04B 14/48;
(Continued)

(56) References Cited

U.S. PATENT DOCUMENTS 4,065,594 A * 12/1977 Shii et al. .................... 428/113
6,102,999 A     8/2000 Cobb, III et al.
(Continued)

FOREIGN PATENT DOCUMENTS

ES    WO 2007141360 A1 * 12/2007 ............. D01D 5/253
JP            2003293216 A   * 10/2003

OTHER PUBLICATIONS

Encyclopedia Britannica, Amorphous Solid, http://www.britannica.com/science/amorphous-solid, 2015, pp. 1-9.*

Primary Examiner — Scott R Walshon
(74) Attorney, Agent, or Firm — McNair Law Firm, P.A.; Douglas W. Kim

(57) ABSTRACT

A new class of high modulus polypropylene multifilament fiber and/or yarn is provided. Such a multifilament fiber and/or yarn exhibits an exceptional combination of high strength and toughness with low weight and density. The inventive fibers thus permit replacement of expensive polymeric fibers within certain applications with lower cost alternatives, or replacement of high density components with such low density fibers, without sacrificing strength or durability. Such multifilament fibers are produced through melt-spinning processes and exhibit highly unique microstructures therein, including significant void volumes, interspersed and crossed voids, and nanofilament bridges within such voids. Such microstructural characteristics appear to impart the exceptional properties noted above.

18 Claims, 13 Drawing Sheets

Related U.S. Application Data continuation-in-part of application No. 11/458,530, filed on Jul. 19, 2006, now Pat. No. 7,869,700, which is a division of application No. 10/983,153, filed on Nov. 5, 2004, now Pat. No. 7,074,483.

(51) Int. Cl.

| | | |
|---|---|---|
| *D01F 1/10* | (2006.01) | |
| *D01F 6/06* | (2006.01) | |
| *D02G 3/04* | (2006.01) | |
| *E04C 5/07* | (2006.01) | |
| *H04N 21/4335* | (2011.01) | |
| *D01D 5/088* | (2006.01) | |
| *H04N 19/31* | (2014.01) | |

(52) U.S. Cl.
CPC ............... *D01F 6/06* (2013.01); *D02G 3/045* (2013.01); *E04C 5/073* (2013.01); *H04N 19/31* (2014.11); *H04N 21/4335* (2013.01); *Y10T 428/298* (2015.01); *Y10T 428/2913* (2015.01); *Y10T 428/2967* (2015.01); *Y10T 428/2975* (2015.01); *Y10T 428/2976* (2015.01)

(58) Field of Classification Search
CPC . C04B 16/0641; C04B 16/0691; C04B 16/06; C04B 16/00; C04B 14/38; D01F 6/06; D01F 6/30; D01F 6/46; D01F 6/04; D01F 6/02; D01F 1/10; C08K 5/378; C08K 5/523; C08K 5/1575; C08K 5/00; C08K 5/05; C08K 5/098; C08K 5/49; C08K 5/0083; C08L 23/02; C08L 23/10; C08L 2666/06; C08L 23/26; C08L 23/00; C08L 23/14; C08L 23/12; C08L 23/20; C08L 2203/12; C08L 2314/02; B32B 2260/021; B32B 2260/046; B32B 2262/0253; B32B 2262/101; B32B 2307/204; B32B 2307/50; B32B 2307/718; B32B 2509/00; B32B 2605/08; B32B 2605/12; B32B 37/00; B32B 27/26; B32B 27/02; B32B 27/12; B32B 27/32; B32B 2250/20; H05K 2201/0158; H05K 2201/0278; H05K 1/0366; B29C 47/0014; B29C 47/0038; B29C 47/30; B29C 70/10; B29L 2031/731; H04N 21/4335; H04N 19/31; E04C 5/073; E04C 5/07; Y10S 428/902; D02G 3/44; D02G 3/045; D02G 3/22; D02G 3/00; D02G 3/445; D02J 1/222; D01D 5/40; D01D 5/098; D01D 5/0885; D01D 10/00; D01D 5/253; C08J 5/04; C08J 5/00; C08J 3/24; C08J 3/14; C08J 2323/02; H01B 13/103; H01B 13/10; H01B 13/06; B29D 7/00; B29D 7/14; Y10T 428/2967; Y10T 428/2913; Y10T 428/2975; Y10T 428/298; Y10T 428/2976
USPC ............. 428/364, 394, 910, 113, 296, 293.7, 428/294.7, 292.1, 221, 395, 411.1, 220, 428/412, 474.4, 500, 400, 902; 442/189, 442/268, 290; 156/229, 306.3, 306, 288, 156/148, 167, 272.2, 308.2, 309.6; 264/113, 173.11, 173.14, 175, 459, 463, 264/174, 324, 171, 258, 22, 138, 280, 264/211.12, 235.6, 164, 205, 210.8, 69, 264/184, 9; 524/108, 141, 387, 480, 487, 524/488, 489, 492, 497, 498, 499, 502 F, 524/585, 366, 462, 464, 583; 525/216, 525/528, 194, 348.1

See application file for complete search history.

(56) References Cited

U.S. PATENT DOCUMENTS

| | | | |
|---|---|---|---|
| 6,197,423 B1 * | 3/2001 | Rieder | ............... B29C 70/10 428/397 |
| 6,465,551 B1 | 10/2002 | Zhao et al. | |
| 6,599,968 B2 | 7/2003 | Zhao et al. | |
| 6,759,124 B2 | 7/2004 | Royer et al. | |
| 7,566,797 B2 | 7/2009 | Xu et al. | |

* cited by examiner

HIGH MODULUS POLYOLEFIN FIBERS EXHIBITING UNIQUE MICROSTRUCTURAL FEATURES

CROSS-REFERENCE TO RELATED APPLICATIONS

This application is a continuation of co-pending U.S. patent application Ser. No. 12/610,007, filed Oct. 30, 2009, which is a continuation-in-part of U.S. patent application Ser. No. 11/438,530, filed May 22, 2006, which is a divisional of U.S. patent application Ser. No. 10/983,153, filed Nov. 5, 2004, which issued as U.S. Pat. No. 7,074,483 on Jul. 11, 2006.

FIELD OF THE INVENTION

A new class of high modulus polypropylene multifilament fiber and/or yarn is provided. Such a multifilament fiber and/or yarn exhibits an exceptional combination of high strength and toughness with low weight and density. The inventive fibers thus permit replacement of expensive polymeric fibers within certain applications with lower cost alternatives, or replacement of high density components with such low density fibers, without sacrificing strength or durability. Such multifilament fibers are produced through melt-spinning processes and exhibit highly unique microstructures therein, including significant void volumes, interspersed and crossed voids, and nanofilament bridges within such voids. Such microstructural characteristics appear to impart the exceptional properties noted above.

BACKGROUND OF THE INVENTION

Yarns and fibers formed from polyolefins can offer many desirable characteristics. For example, they can possess good tactile qualities such as hand feel, they can be resistant to degradation and erosion, and the raw materials can be easy to obtain as well as fairly inexpensive. As such, monofilament fibers as well as multifilament yarns have been formed from various polyolefins such as polypropylene. While the development of monofilament polyolefin fibers that have high modulus and high tenacity has been achieved, the ability to produce high modulus, high tenacity multifilament yarns of similar materials has not been as successful. As such, there remains room for improvement and variation within the art.

Previous polyolefin fibers have been produced through typical spinning procedures, primarily solution-spun methods, that result in polyolefin fibers having relatively large amounts of solvents present therein that dilute the overall polyolefin constituency. These typical spinning procedures also take into account monofilament-type polymers wherein the target fibers are produced from a sole spinneret. Multifilament fibers are produced from a plurality of spinnerets, to the contrary, and require a capability of interaction between the individual components to form a strong, effective fiber of multiple filaments. Additionally, such typical polyolefin fibers are produced with drawing subsequent to spinning production, albeit at draw ratios that permit the filaments to extend to very long lengths in order to provide very thin fibers thereof; there have been no disclosures or teachings of past polyolefin fiber producing methods wherein the draw ratio exceeds a limited number, for instance from 1 to about 4.

SUMMARY OF THE INVENTION

In one embodiment, the present invention is directed to a method of forming a polypropylene multifilament yarn. For example, the method can include forming a melted polymeric composition including a polypropylene, extruding the composition to form multiple filaments, quenching the filaments in a liquid bath, collecting the filaments to form a fiber bundle, and drawing the fiber bundle in a heated drawing step with a draw ratio greater than about 6, and in one embodiment, greater than about 10.

The polypropylene can be any such type suitable for forming yarn. For example, the polypropylene can be a copolymer of a mixture of a polypropylene and another such polymer or a different polyolefin. In one embodiment, the polypropylene can have a melt flow index between about 0.2 and about 50.

In one embodiment, the polypropylene can contain a nucleating agent. For example, the nucleating agent can be a dibenzylidene sorbitol nucleating agent as is generally known in the art. Generally, the nucleating agent can be present in the melt in an amount less than about 1% by weight of the extruded composition, though this is not a requirement of the invention.

The extruder can generally be any standard multi-orifice extruder. For example, the extruder can define multiple orifices, and each orifice can have a maximum cross-sectional dimension of between about 0.001 and about 0.050 inches.

The melt can be extruded fairly slowly, for example between about 1 m/min and about 25 m/min into the liquid quench bath. Optionally, the bath can be heated, such as to a temperature of between about 50° C. and about 130° C. In one embodiment, the surface of the quench bath can be quite close to the extruder orifices, for example within the distance of the die swell of the filaments. In another embodiment, the area immediately downstream of the orifice can be protected by a heated or an unheated gaseous shroud.

The heated drawing step can be carried out in an oven, utilizing heated drawing rolls, or according to any other suitable heating method. Generally, the heated drawing step can be carried out at a temperature of between about 80° C. and about 170° C. For example, the oven or the drawing rolls can be heated to the desired temperature. The heated drawing step can also be carried out at an even higher temperature if, for example, the yarn is exposed to the heat for a very short period of time.

Other processes can also be carried out in forming the disclosed multifilament yarn such as one or more of the following: application of a lubricant, a second draw, or heat setting of the yarn.

In another embodiment, the invention is directed to yarn that can be formed according to the disclosed processes. For instance, the yarn can include multiple filaments that can each describe a denier of less than about 300, in one embodiment each filament can have a denier of between about 0.5 and about 100. The yarn can have a high modulus, for instance greater than 40 g/d. In another embodiment, the yarn can have a modulus greater than 100 g/d, or greater than 150 g/d in some embodiments. The yarn can also have a high tenacity, for example greater than about 5 g/d in some embodiments, and greater than about 7 g/d in other embodiments. The disclosed yarns can also be fairly resistant to stretching, for example, the yarn can exhibit an elongation of less than about 10%.

The disclosed yarn is also believed to possess a crystalline structure that is unique for multifilament polypropylene yarn. For instance, at least one of the filaments in the yarn can possess greater than 80% crystallinity, according to known wide-angle x-ray scattering (WAXS) measuring techniques. In one embodiment, at least one of the filaments in the yarn can have a ratio of equatorial intensity to meridonal intensity greater than about 1.0, which can be obtained from known small angle x-ray scattering (SAXS) measuring techniques. In another embodiment, the ratio of equatorial intensity to meridonal intensity can be greater than about 3.0.

In another embodiment, the inventive polypropylene multifilament fibers and yarns exhibit a significant amount of voids therein leading to a rather low fiber density property while simultaneously exhibiting an extremely high modulus strength, a result that is seemingly counterintuitive in nature. The actual high void volume creates an extremely high surface area for the typically made inventive polypropylene fiber (about, for instance, 1.5 m.sup.2/g), particularly as compared with void-free polypropylene fibers. In actuality, as an example, inventive polypropylene fibers that are measured at a 52 micron mean diameter will exhibit a specific surface area equivalent to fibers of a mean diameter of only 3 microns. This increased surface area helps to increase the capability of adhesion promoters to increase the strength of composites made from such fibers. In addition, the high modulus strength appears to be provided through the existence and alignment of such voids and cracks throughout the fibers themselves. For example, the inventive polypropylene fibers and yarns exhibit, under SEM imaging, such voids and cracks aligned in the fiber axis direction, thus permitting intersection primarily (if not solely) across the subject fiber's diameter. The void presence thus reduces the density measurements (and overall weight), yet increases the surface area, and, at the same time, accords high strength to the overall fiber by their presence within low intensity regions while high intensity regions prevent further crack propagation. In effect, and as described to a greater degree below, it appears that the voids and cracks present within the inventive polypropylene fibers provide the low density, while also increasing the strength and toughness of the same fiber through their aligned placement within the fiber as well. As such, the specific manufacturing method described herein imparts a resultant high strength with very low density, providing the industry with the first low-weight, high modulus polypropylene fiber.

The inventive fibers may thus be defined (and thus encompass) as follows:

a) a polyolefin multifilament fiber exhibiting repeated multiple striations therein aligned substantially perpendicularly along the longitudinal axis of said fiber, wherein said striations extend from the surface of said fiber and wherein at least a portion of said striations extend within the internal regions of said fiber;

b) a polyolefin multifilament fiber exhibiting a modulus strength of at least 8 GPa with a fiber diameter of at most 100 microns, said fiber internally comprising a plurality of microfibrils therein, wherein said fiber further exhibits a plurality of voids interspersed within said microfibrils, wherein both said microfibrils and said voids are aligned substantially parallel to the longitudinal axis of said fiber;

c) a polyolefin multifilament fiber exhibiting a modulus strength of at least 8 GPa with a fiber diameter of at most 100 microns, said fiber further exhibiting voids therein, wherein said voids exhibit include a plurality of nanofilament bridges;

d) a polyolefin multifilament fiber exhibiting a shear stress tensile failure mechanism at a level less than a ductile fracture tensile failure mechanism; and/or e) a polyolefin multifilament fiber exhibiting a modulus strength of at least 8 GPa with a fiber diameter of at most 100 microns, where said fiber exhibits a hot air shrinkage of less than 5% at 150° C.

In one embodiment, the invention is directed to secondary products that can be formed and can include the disclosed yarns. For example, the disclosed yarn can be beneficially utilized in forming ropes, woven materials, and nonwoven materials.

In one embodiment, the disclosed yarn can be utilized in reinforcement materials, for instance reinforcement materials for use in reinforcing a hydratable cementitious composition. For example, a yarn formed according to the disclosed processes can be chopped into smaller pieces, generally less than about 5 inches, to form a reinforcement material. In one embodiment, the yarn can be chopped into pieces of less than about 3 inches in length. In another embodiment, it can be chopped into pieces of less than about 1 inch in length. Optionally, the reinforcement materials can be degraded and/or deformed in addition to being cut into smaller pieces.

BRIEF DESCRIPTION OF THE FIGURES

A full and enabling disclosure of the present invention, including the best mode thereof, to one of ordinary skill in the art, is set forth more particularly in the remainder of the specification, including reference to the accompanying Figures in which.

Figure 1:
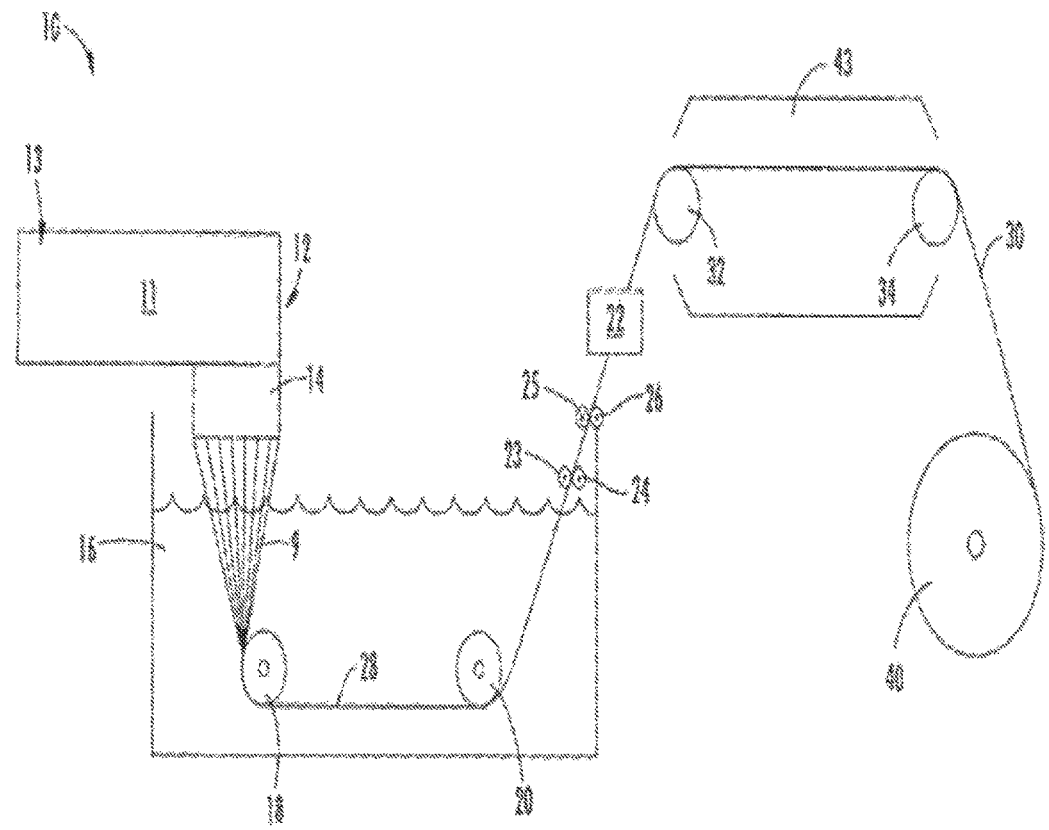
FIG. 1 illustrates one embodiment of a process according to the present invention.

Repeat use of reference characters in the present specification and drawings is intended to represent the same or analogous features or elements of the present invention.

DETAILED DESCRIPTION OF THE INVENTION

Reference will now be made in detail to various embodiments of the invention, one or more examples of which are set forth below. Each embodiment is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used in another embodiment to yield a still further embodiment. Thus, it is intended that the present invention cover such modifications and variations as come within the scope of the appended claims and their equivalents.

In general, the present invention is directed to multifilament polyolefin yarns and methods suitable for forming the disclosed multifilament polyolefin yarns. Beneficially, the disclosed methods can be utilized to form multifilament polyolefin yarns that can exhibit at least one of higher modulus or higher tenacity as compared to previously known multifilament polyolefin yarns.

The methods of the disclosed invention are generally directed to a melt-spinning yarn formation process. More particularly, the process utilized in forming the disclosed yarns can include forming a molten composition including a polyolefin, extruding multiple (i.e., at least three) individual filaments of the composition at a relatively low spinning rate, quenching the filaments in a liquid, forming a yarn structure of the multiple individual filaments, and mechanically drawing the yarn structure while the structure is heated.

In one particular embodiment, the polyolefin utilized in forming the disclosed yarns can be a polypropylene. This is not a requirement of the present invention, however, and though the ensuing discussion is generally directed toward polypropylene, it should be understood that other polyolefins can optionally be utilized in the invention. For example, in one embodiment, the disclosed invention can be directed to the formation of polyethylene or polybutylene multifilament yarn.

In addition, and for purposes of this disclosure, the term polypropylene is intended to include any polymeric composition comprising propylene monomers, either alone (i.e., homopolymer) or in mixture or copolymer with other polyolefins, dienes, or other monomers (such as ethylene, butylene, and the like). The term is also intended to encompass any different configuration and arrangement of the constituent monomers (such as syndiotactic, isotactic, and the like). Thus, the term as applied to fibers is intended to encompass actual long strands, tapes, threads, and the like, of drawn polymer.

For purposes of this disclosure, the terms fiber and yarn are intended to encompass structures that exhibit a length that far exceeds their largest cross-sectional dimension (such as, for example, the diameter for round fibers). Thus, the term fiber as utilized herein differs from structures such as plaques, containers, sheets, and the like that are blow-molded or injection molded. Moreover, the term multifilament yarn is intended to encompass a structure that includes at least three filaments that have been individually formed such as, for example, via extrusion through a spinneret, prior to being brought in proximity to one another to form a single yarn structure.

One embodiment of the presently disclosed process generally 10 is schematically illustrated in FIG. 1. According to the illustrated embodiment, a polymeric composition can be provided to an extruder apparatus 12. For example, in one embodiment, the polymeric composition can include polypropylene.

Generally, any polypropylene suitable for forming drawn yarn can be utilized in the disclosed process. For instance, polypropylene suitable for the present invention can generally be of any standard melt flow. For example, in one embodiment, standard extrusion grade polypropylene resin possessing ranges of melt flow indices (MFI) between about 0.2 and about 50 can be utilized in forming the disclosed multifilament yarns. In one embodiment, polypropylene possessing an MFI between about 0.5 and about 25 can be utilized. In one embodiment, the polypropylene utilized in forming the multifilament yarn can have an MFI between about 1 and about 15.

In one embodiment, the polymeric composition provided to the extruder apparatus 12 can include polypropylene and a nucleating agent. According to this embodiment, the nucleating agent can generally be any material that can provide nucleation sites for the polypropylene crystals that can form during the transition of the polypropylene from the molten state to the solid structure. In one embodiment, the nucleating agent can exhibit high solubility in the polypropylene, though this is not a requirement of the invention. A non-limiting list of exemplary nucleating agents can include, for example, dibenzylidene sorbitol nucleating agents, as are generally known in the art, such as dibenzylidene sorbitol (DBS), monomethyldibenzylidene sorbitols such as 1,3:2,4-bis(p-methylbenzylidene) sorbitol (p-MDBS), dimethyl dibenzylidene sorbitols such as 1,3:2,4-bis(3,4-dimethylbenzylidene) sorbitol (3,4-DMDBS), and the like. Other suitable nucleating agents can include sodium benzoate, phosphate ester salts, such as NA-11 and NA-21, developed by Asahi Denka of Japan, or the hyper nucleating agents developed by Milliken Chemical of South Carolina such as, for example, HYPERFORM® HPN-68L.

According to the disclosed process, the polymeric composition, which can, in one embodiment include polypropylene combined with a nucleating agent, can be provided to an extruder apparatus 12. In this particular embodiment, the polypropylene component and the nucleating agent can be provided to the extruder apparatus 12 either separately or together, as at an inlet 13. For example, polypropylene and a nucleating agent can be provided to the extruder 12 either separately or together in liquid, powder, or pellet form. For instance, in one embodiment, both the polypropylene and the nucleating agent can be provided to the extruder 12 in pellet form at inlet 13. In another embodiment, the nucleating agent can be provided to the extruder apparatus 12 in a liquid form. For example, nucleating agents in a liquid form such as those disclosed in U.S. Pat. No. 6,102,999 to Cobb, Ill., et al., which is incorporated herein by reference, can be utilized in the process.

When included, the nucleating agent can generally be present in the mixture to be extruded in an amount less than about 1% by weight of the composition. For example, the nucleating agent can be present in the mixture in an amount less than about 0.5% by weight. In one embodiment, the nucleating agent can be present in the mixture in an amount between about 0.01% by weight and about 0.3% by weight. In another embodiment, the nucleating can be present in the mixture in an amount between about 0.05% by weight and about 0.25% by weight.

The mixture including the polypropylene and, optionally, the nucleating agent can also include various other additives as are generally known in the art. For example, in one embodiment, the disclosed multifilament yarn can be colored yarn, and the mixture can include suitable coloring agents, such as dyes or other pigments. According to this embodiment, it may be preferable to utilize a nucleating agent that will not affect the final color of the multi-component yarn, but this is not a requirement of the invention, and in other embodiments, nucleating agents can be utilized that enhance or otherwise affect the color of the formed yarn. Other additives that can be combined with the mixture can include, for example, one or more of anti-static agents, antioxidant agents, antimicrobial agents, adhesion agents, stabilizers, plasticizers, brightening compounds, clarifying agents, ultraviolet light stabilizing agents, surface active agents, odor enhancing or preventative agents, light scattering agents, halogen scavengers, and the like. In addition, additives can be included in the melt, or in some embodiments, can be applied as a surface treatment to either the undrawn fiber bundle or optionally to the drawn yarn, as generally known in the art.

In one embodiment, the extruder apparatus 12 can be a melt spinning apparatus as is generally known in the art. For example, the extruder apparatus 12 can include a mixing manifold 11 in which a composition including one or more polyolefins and any other desired additives can be mixed and heated to form a molten composition. The formation of the molten mixture can generally be carried out at a temperature so as to ensure melting of essentially all of the polypropylene. For example, in one embodiment, the mixture can be mixed and melted in a manifold 11 heated to a temperature of between about 175° C. and about 325° C.

Optionally, to help ensure the fluid state of the molten mixture, in one embodiment, the molten mixture can be filtered prior to extrusion. For example, the molten mixture can be filtered to remove any fine particles from the mixture with a filter of between about 180 and about 360 gauge.

Following formation of the molten mixture, the mixture can be conveyed under pressure to the spinneret 14 of the extruder apparatus 12, where it can be extruded through multiple spinneret orifices to form multiple filaments 9. For instance, the spinneret can define at least three spinneret orifices. In one embodiment, the spinneret can define between 4 and about 100,000 individual spinneret orifices. For purposes of this disclosure, the terms extrusion die and spinneret are used herein interchangeably and intended to mean the same thing; the same is true for the terms spinneret orifice, spinneret aperture, extruder orifice and extruder aperture. The spinneret 14 can generally be heated to a temperature that can allow for the extrusion of the molten polymer while preventing breakage of the filaments 9 during formation. For example, in one embodiment, the spinneret 14 can be heated to a temperature of between about 175° C. and about 325° C. In one embodiment, the spinneret 14 can be heated to the same temperature as the mixing manifold 11. This is not a requirement of the process, however, and in other embodiments, the spinneret 14 can be at a different temperature than the mixing manifold 11.

The spinneret orifices through which the polymer can be extruded can generally be less than about 0.1 inches in maximum cross-sectional distance (e.g., diameter in the particular case of a circular orifice). For example, in one embodiment, the spinneret orifices can be between about 0.002 inches and about 0.050 inches in maximum cross-sectional distance.

According to the present invention, the polymer can be extruded through the spinneret at a relatively high throughput. For example, the polymer can be extruded through the spinneret at a throughput of not less than about 50% of that required to give melt fracture. In other words, the throughput can be at least 50% of the throughput at which the molten exudate can become excessively distorted. The specific melt fracture throughput can generally vary depending upon one or more of the exudate material, the total number of apertures in the spinneret, the spinneret aperture size, as well as the exudate temperature. For example, when considering the extrusion of molten polypropylene through a spinneret of 8 round apertures of 0.012-inch diameter each, melt fracture can occur at a pump speed of between about 22 and about 24 revolutions/minute of a 0.160 cm.sup.3/rev melt pump, or a throughput of about 5.5-6.0 g/min, when extruding a 4 melt flow homopolymer polypropylene at a spinneret temperature of about 230° C. Specific melt fracture throughput values for any particular system and materials as well as methods of obtaining such are generally known to those of skill in the art, and thus a detailed discussion of this phenomenon is not included herein.

In addition to a relatively high throughput, the filaments can also be formed at a relatively low spinline tension. The combination of high throughput with low spinline tension can allow the filaments to be formed with a relatively low ratio of orifice size to final drawn filament size as compared to other previously known multifilament formation processes. For instance, the ratio of the maximum cross-sectional width of an orifice to the maximum cross-sectional distance of a single fully drawn filament extruded through the orifice can, in one embodiment, be between about 2 and about 10. In one embodiment, this ratio can be between about 3 and about 8. Accordingly, the material forming each filament can be in a fairly relaxed, disorganized state as it begins to cool and crystallize.

Referring again to FIG. 1, following extrusion of the polymer, the undrawn filaments 9 can be quenched in a liquid bath 16 and collected by a take-up roll 18 to form a multifilament fiber structure or fiber bundle 28. While not wishing to be bound by any particular theory, it is believed that by extruding the filaments at a relatively low spinline tension and high throughput combined with quenching the polymeric filaments in a liquid bath, the presently disclosed process encourages the formation of folded chain crystals in a highly disordered state in the polymer, which in turn enables a high draw ratio to be utilized in the process and thereby enables the formation of a multifilament yarn having high tenacity and modulus.

As is generally known in the art, polymers that are crystallized from a melt under dynamic temperature and stress conditions crystallize with the rate of crystallization dependent upon both the number of nucleation sites as well as on the growth rate of the polymer. Moreover, both of these factors are in turn related to the conditions that the polymer is subject to as it is quenched. In addition, polymers that crystallize when in a highly oriented state tend to have limited tenacity and modulus as evidenced by the limited draw ratios possible for such highly oriented polymers. Thus, in order to obtain a multifilament yarn with high tenacity and modulus, i.e., formed with a high draw ratio, crystallization of the polymer while in a highly disordered state is suggested. Accordingly, the present invention discloses a multifilament yarn formation process in which crystallization of the polymer in a highly disordered state is promoted by encouraging the filament to maximize its relaxation into the desired disoriented state during crystallization by forming the polymer at a relatively high throughput and low spinline tension. Optionally, a higher rate of crystallization can also be encouraged in certain embodiments through addition of a nucleating agent to the melt. In addition, quenching the formed polymer filaments in a liquid bath can promote the formation of folded chain crystals, which is also associated with the high draw ratios of high tenacity, high modulus materials.

As described, the individual filaments 9 can be extruded according to the disclosed process at relatively low spinline tension. As such, the take-up roll 18 can operate at a relatively low speed. For example, the take-up roll 18 can generally be set at a speed of less than about 25 meters per minute (m/min). In one embodiment, the take-up roll 18 can be set at a speed of between about 1 m/min and about 20 m/min.

The liquid bath 16 in which the filaments 9 can be quenched can be a liquid in which the polymer is insoluble. For example, the liquid can be water, ethylene glycol, or any other suitable liquid as is generally known in the art. In one embodiment, in order to further encourage the formation of folded chain crystals in the filaments 9, the bath 16 can be heated. For example, the bath can be heated to a temperature near the maximum crystallization temperature ($T_c$) of the polymer. For example, the bath can be heated to a temperature of between about 50° C. and about 130° C.

Generally, in order to encourage formation of filaments with substantially constant cross-sectional dimensions along the filament length, excessive agitation of the bath 16 can be avoided during the process.

Figure 2:
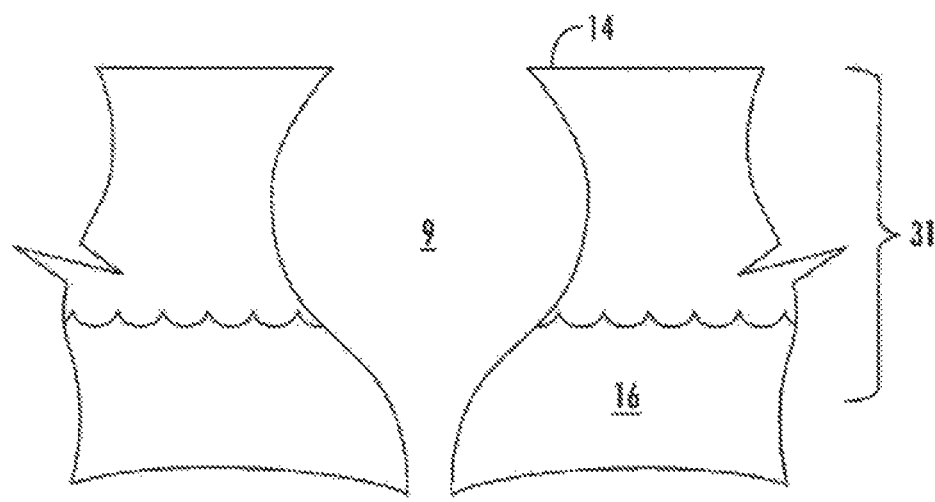
FIG. 2 illustrates the die swell of a single filament formed according to one embodiment of the present invention.

In one embodiment, quenching of the polymer can begin as soon as possible following exit from the spinneret, in order to encourage crystallization of the polymer while in the highly disoriented, relaxed state immediately following extrusion. For example, in one embodiment, the surface of the bath 16 can be located at a minimum distance from the spinneret 14. For instance, in the embodiment illustrated in FIG. 2, the surface of the bath 16 can be at a distance from the spinneret 14 such that an extruded filament 9 can enter the bath 16 within the distance of the die swell 31 of the filament 9. Optionally, the individual filaments 9 can pass through a heated or a non-heated shroud prior to entering the bath 16. For example, a heated shroud may be utilized in those embodiments where the distance between the orifice and the bath surface is greater than the die swell. In one embodiment, the distance between the spinneret and the bath can be less than 2 inches. In another embodiment, this distance can be less than 1 inch.

Take-up roll 18 and roll 20 can be within bath 16 and convey individual filaments 9 and fiber bundle 28 through the bath 16. Dwell time of the material in the bath 16 can vary, depending upon particular materials included in the polymeric material, particular line speed, etc. In general, filaments 9 and subsequently formed fiber bundle 28 can be conveyed through bath 16 with a dwell time long enough so as to ensure complete quench, i.e., crystallization, of the polymeric material. For example, in one embodiment, the dwell time of the material in the bath 16 can be between about 6 seconds and about 1 minute.

At or near the location where the fiber bundle 28 exits the bath 16, excess liquid can be removed from the fiber bundle 28. This step can generally be accomplished according to any process known in the art. For example, in the embodiment illustrated in FIG. 1, the fiber bundle 28 can pass through a series of nip rolls 23, 24, 25, 26 to remove excess liquid from the fiber bundle. Other methods can be alternatively utilized, however. For example, in other embodiments, excess liquid can be removed from the fiber bundle 28 through utilization of a vacuum, a press process utilizing a squeegee, one or more air knives, and the like.

In one embodiment, a lubricant can be applied to the fiber bundle 28. For example, a spin finish can be applied at a spin finish applicator chest 22, as is generally known in the art. In general, a lubricant can be applied to the fiber bundle 28 at a low water content. For example, a lubricant can be applied to the fiber bundle 28 when the fiber bundle is at a water content of less than about 75% by weight. Any suitable lubricant can be applied to the fiber bundle 28. For example, a suitable oil-based finish can be applied to the fiber bundle 28, such as Lurol PP-912, available from Goulston Technologies, Inc. Addition of a finishing or lubricant coat on the yarn can, in some embodiments of the invention, improve handling of the fiber bundle during subsequent processing and can also reduce friction and static electricity build-up on the yarn. In addition, a finish coat on the yarn can improve slip between individual filaments of the yarn during a subsequent drawing process and can increase the attainable draw ratio, and thus increase the modulus and tenacity of the drawn multifilament yarn formed according to the disclosed process.

After quenching of the fiber bundle 28 and any optional process steps, such as addition of a lubricant for example, the fiber bundle can be drawn while applying heat. For example, in the embodiment illustrated in FIG. 1, the fiber bundle 28 can be drawn in an oven 43 heated to a temperature of between about 80° C. and about 170° C. Additionally, in this embodiment, the draw rolls 32, 34 can be either interior or exterior to the oven 43, as is generally known in the art. In another embodiment, rather than utilizing an oven as the heat source, the draw rolls 32, 34 can be heated so as to draw the yarn while it is heated. For example, the draw rolls can be heated to a temperature of between about 80° C. and about 170° C. In another embodiment, the yarn can be drawn over a hotplate heated to a similar temperature (i.e., between about 80° C. and about 170° C.). In one embodiment, the oven, draw rolls, hotplate, or any other suitable source of heat can be heated to a temperature of between about 120° C. and about 150° C.

According to the disclosed process, the multifilament fiber bundle can be drawn in a first (or only) draw at a high draw ratio, higher than those attainable in previously known polyolefin melt-spun multifilament yarn formation processes. For example, the fiber bundle 28 can be drawn with a draw ratio (defined as the ratio of the speed of the second or final draw roll 34 to the first draw roll 32) of greater than about 6. For instance, in one embodiment, the draw ratio of the first (or only) draw can be between about 6 and about 25. In another embodiment, the draw ratio can be greater than about 10, for instance, greater than about 15. Additionally, the yarn can be wrapped on the rolls 32, 34 as is generally known in the art. For example, in one embodiment, between about 5 and about 15 wraps of the yarn can be wrapped on the draw rolls.

While the illustrated embodiment utilizes a series of draw rolls for purposes of drawing the yarn, it should be understood that any suitable process that can place a force on the yarn so as to elongate the yarn following the quenching step can optionally be utilized. For example, any mechanical apparatus including nip rolls, godet rolls, steam cans, air, steam, or other gaseous jets can optionally be utilized to draw the yarn.

According to the embodiment illustrated in FIG. 1, following the yarn drawing step, the multifilament yarn 30 can be cooled and wound on a take-up roll 40. In other embodiments, however, additional processing of the yarn 30 may be carried out. For example, in one embodiment, the multifilament yarn can be subjected to a second draw. In general, a second drawing step can be carried out at a higher temperature than the first draw. For instance, the heating element of the second drawing step can be heated to a temperature between about 10° C. and about 50° C. higher than the heating element of the first drawing step. In addition, a second draw can generally be at a lower drawing ratio that the first draw. For example, a second draw can be carried out at a draw ratio of less than 5. In one embodiment, a second draw can be carried out at a draw ratio of less than 3. In the case of multiple draws, the total draw ratio will be the product of each of the individual draws, thus a yarn first drawn at a draw ratio of 3, and then subsequently drawn at a draw ratio of 2 will have been subjected to a total draw ratio of 6.

Optionally, the drawn multifilament yarn can be heat set. For example, the multifilament yarn can be relaxed or subjected to a very low draw ratio (e.g., a draw ratio of between about 0.7 and about 1.3) and subjected to a temperature of between about 130° C. and about 150° C. for a short period of time, generally less than 3 minutes. In some embodiment, a heat setting step can be less than one minute, for example, about 0.5 seconds. This temperature can generally be higher than the drawing temperature(s). This optional heat set step can serve to "lock" in the crystalline structure of the yarn following drawing. In addition, it can reduce heat shrinkage, which may be desired in some embodiments.

In another embodiment, the finished yarn can be surface treated to improve certain characteristics of the yarn, such as wettability or adhesion, for example. For instance, the yarn can be fibrillated, subjected to plasma or corona treatments, or can include an added surface yarn sizing, all of which are generally known in the art, to improve physical characteristics of the yarns. Beneficially, the multifilament yarns of the invention can have a high surface area available for surface treatments, and thus can exhibit greatly improved characteristics, such as adhesion, as compared to, for instance, monofilament fibers formed of similar materials.

In general, the finished multifilament yarn 30 can be wound on a spool or take-up reel 40, as shown, and transported to a second location for formation of a secondary product. In an alternative embodiment, however, the multifilament yarn can be fed to a second processing line, where the yarn can be further processed to form a secondary product, such as a woven fabric, for example.

The polyolefin multifilament yarn of the present invention can generally have a drawn size of between about 0.5 denier per filament and about 100 denier per filament. Beneficially, the disclosed multifilament yarn can have a high tenacity and modulus, as measured in ASTM D2256-02, which is incorporated herein by reference, and as compared to other, previously known multifilament polyolefin yarn. For example, the disclosed multifilament yarn can have a tenacity greater than about 5 grams/denier.

In one embodiment, the multifilament yarn can have a tenacity greater than about 7 grams/denier. In addition, the multifilament yarn of the present invention can have a high modulus, for example, greater than about 100 grams/denier. In one embodiment, the disclosed yarn can have a modulus greater than about 125 grams/denier, for example, greater than about 150 grams/denier, or greater than about 200 grams/denier.

In addition, the disclosed yarn can exhibit relatively low elongation characteristics. For example, the multifilament yarn of the present invention can exhibit an elongation percentage of less than about 15%, as measured in ASTM D2256-02. In another embodiment, the yarn can exhibit less than about 10% elongation, for example, less than about 8% elongation.

The inventive multifilament yarns are also believed to possess a unique crystalline structure as compared to other, previously known polyolefin multifilament yarns. There are several widely accepted means by which to measure molecular orientation in oriented polymer systems, among them scattering of light or X-rays, absorbance measurements, mechanical property analysis, and the like. Quantitative methods include wide angle X-ray scattering (WAXS), and small angle X-ray scattering (SAXS).

Figure 3:
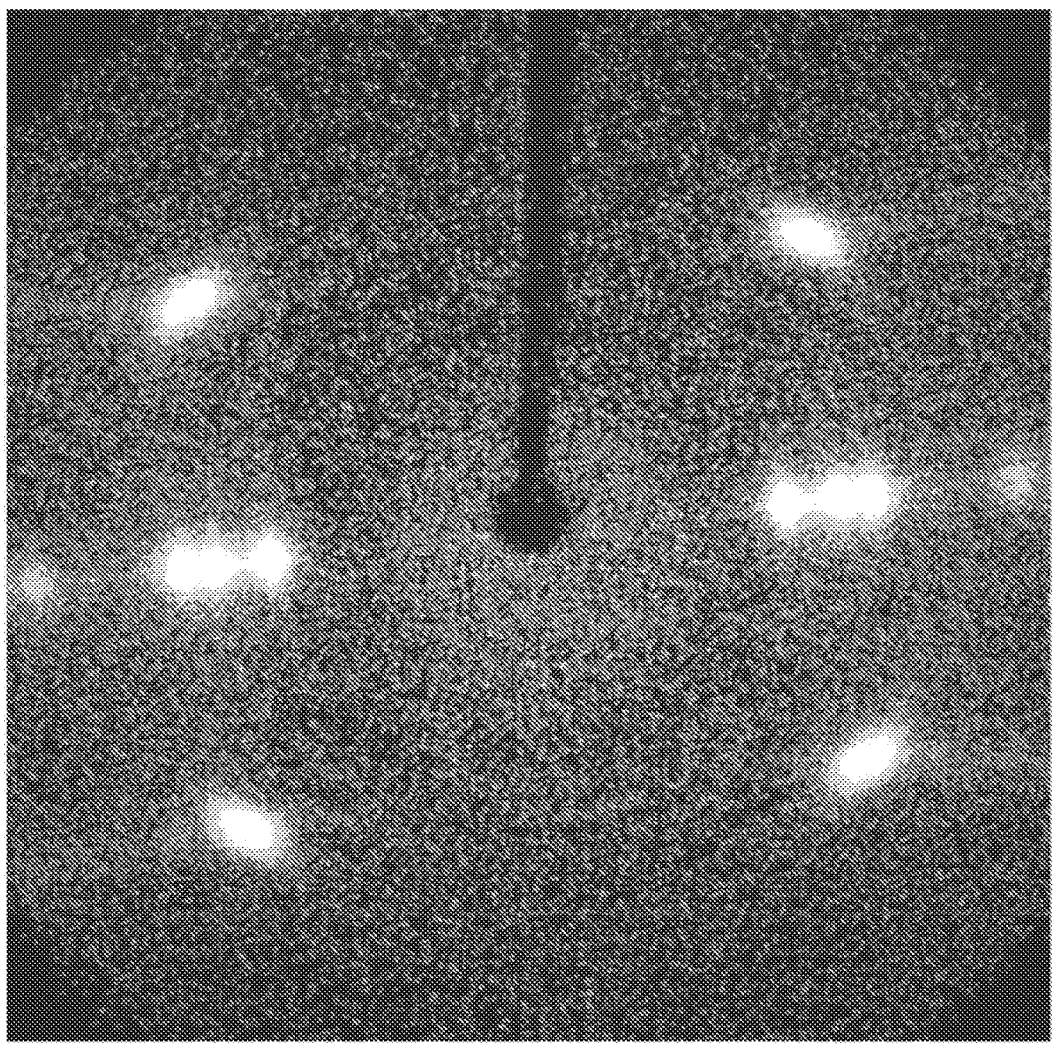
FIG. 3 is the WAXS scattering pattern of a polypropylene filament pulled from a multifilament yarn formed according to one embodiment of the presently disclosed processes.

Through the utilization of WAXS and SAXS techniques, the disclosed multifilament yarns can be shown to be highly crystalline, highly oriented, with little or no lamellar structure. In particular, the filaments of the yarns can possess greater than about 80% crystallinity according to WAXS measuring techniques described below. For example, FIG. 3 illustrates the WAXS scattering pattern of a single filament pulled from a multifilament yarn formed according to the presently disclosed process. In particular, the yarn (listed as sample Q in the Example section, below) was extruded through a spinneret with eight orifices of 0.012 inches diameter each, quenched in a water bath at 73° C., and drawn at a draw ratio of 16.2. The drawn yarn had a final denier of 406 grams/9000 m. As can be seen with reference to the Figure, where 0ϕ (phi) is parallel to the yarn, the amorphous region of the disclosed yarns can be 2ϕ from 10 to 30 and ϕ from 60 to 90 (the dark region near bottom of FIG. 3), and the crystalline region can be 2ϕ from 10 to 30 and ϕ from −15 to 15 (including bright spots on the sides of FIG. 3). Thus by integrating the x-ray scattering intensity in the crystalline and amorphous regions, the crystallinity of the filament can be obtained as:

$$\frac{(l_x - l_A)}{(l_x)}$$

where $l_x$ is the intensity in the crystalline region and $l_A$ is the intensity in the amorphous region.

In addition, the polyolefin yarns of the invention can be highly oriented, as shown by the narrow width of the WAXS peaks in FIG. 3.

Figure 4:
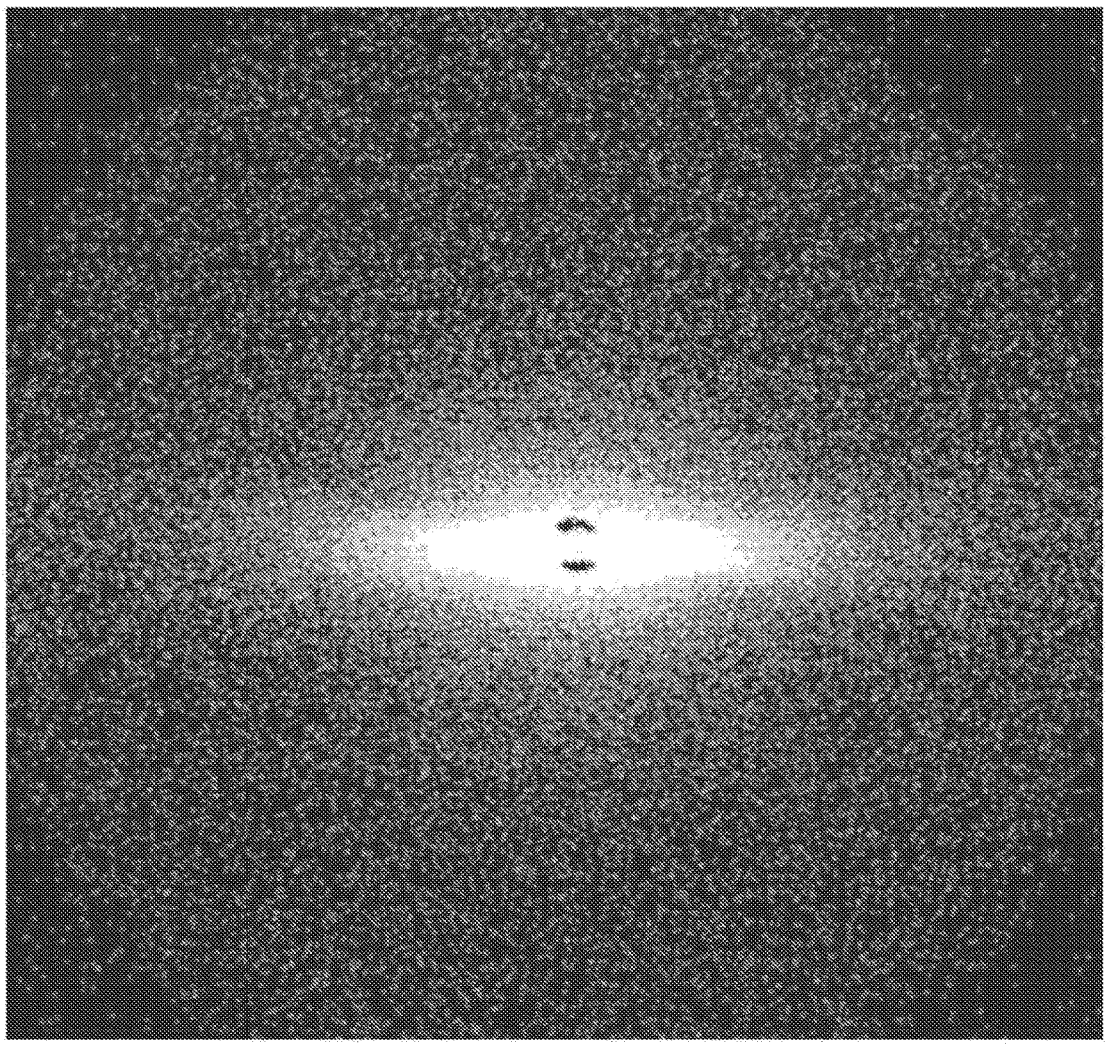
FIG. 4 is the SAXS scattering pattern of the polypropylene filament of FIG. 3.

FIG. 4 is the SAXS pattern of the filament shown in FIG. 3. Surprisingly, none of the expected structures relating to the crystalline form, orientation, and amorphous regions appear in the Figure, and the yarn appears to have no true amorphous regions at all, but appears to be composed entirely of crystalline regions and highly oriented amorphous regions.

SAXS patterns of multifilament yarns formed according to previously known methods generally include alternating crystalline and amorphous regions as illustrated by bright spots of scattering intensity in the yarn axis. (See, for example, *Polypropylene Fibers-Science and Technology*, M. Ahmed, Elsevier Scientific Publishing Company, 1982, pp. 192-203, which is incorporated herein by reference.) The positions of these spots can be utilized to obtain the long period spacing between repeating crystalline regions. The absence of these spots in FIG. 4 indicates that any amorphous regions in the inventive yarn of FIG. 4 have nearly identical electron density to the crystalline regions, and are thus composed of dense, highly oriented amorphous chains, or are absent altogether. When combined with the WAXS pattern of FIG. 3, which indicates that the amorphous intensity is at least 15%, it may be assumed that amorphous regions of the illustrated filament most likely consists of the highly oriented chains.

In addition, the equatorial scattering in SAXS patterns in general arises from the center normal to the fiber axis and projects in a long, thin streak away from the center in each direction. In the inventive yarns, and in further reference to FIG. 4, these equatorial scattering streaks have amplified greatly, to the point that they are more aptly described as "wings." This equatorial scattering arises from fibrillation of the crystalline segments into more clearly defined needle-like assemblies. A long equatorial streak arises from a high concentration of cylindrical, shish-type structures in the yarn with the lamellae organized among or around the shishes, as "kabobs." These streaks generally appear in higher draw situations such as those of the present invention. As can also be seen in FIG. 4, the filaments forming the yarns of the present invention under high draw conditions can describe a nearly absent meridonal reflection and an equatorial scattering that is strong such that the scattering ratio of equatorial to meridonal scattering intensity is high, but there remains strong density contrast as indicated by the overall intensity.

In general, the filaments forming the multifilament yarns of the present invention can have SAXS characteristics including a ratio of equatorial intensity to meridonal intensity of greater than about 1.0. In one embodiment, this ratio can be greater than about 3. The filaments forming the disclosed yarns can generally exhibit an equatorial intensity integrated from 2θ of between about 0.4 to about 1.0 and φ from about 60 to about 120 and from about 240 to about 300 (zero φ being parallel to the yarn, or vertical in reference to FIG. 4). In addition, the yarns can exhibit a meridonal intensity integrated from 2θ of between about 0.4 and about 1.0 and φ from about −60 to about 60 and from about 120 to about 240.

The disclosed multifilament polyolefin yarns can be beneficially utilized in many applications. For example, the high strength and high tenacity of the disclosed yarns can provide them with excellent qualities for utilization in any application suitable for previously known multifilament polyolefin yarns. For example, in certain embodiments, the disclosed yarns can be beneficially utilized as reinforcement material in a matrix. For example, in one embodiment, following formation of the multifilament drawn yarn according to the disclosed processes, the yarn can be further processed so as to be suitable for use as a reinforcement material in a matrix. For instance, the multifilament yarns of the present invention can be chopped, fibrillated, flattened or otherwise deformed as is generally known in the art. As the multifilament yarns are processed in order to form the disclosed reinforcement materials, the multifilament yarns can not only be shortened, deformed, abraded, and the like, but in addition, the multifilament yarns can become shredded. That is, during processing, individual filaments of the yarns can become separated from one another in forming the disclosed reinforcement materials.

Accordingly, in one embodiment, the present invention is directed to reinforcement materials formed of the disclosed yarns. In particular, the reinforcement materials of the present invention can include chopped, shredded, and/or degraded yarns as herein described. In general, the reinforcement materials can include relatively short lengths of the multifilament yarns and/or individual filaments that have been shredded off of the formed multifilament yarns. For example, the reinforcement materials of the present invention can generally be less than about 5 inches in length. In one embodiment, the reinforcement materials can be less than about 3 inches in length, for instance, less than about 1 inch in length.

During use, the reinforcement materials of the disclosed invention can be combined with a matrix material such as adhesives, asphalt, plastics, rubber, or hydratable cementitious compositions including ready-mix or pre-cast concrete, masonry concrete, shotcrete, bituminous concrete, gypsum compositions, cement-based fireproofing compositions, and the like.

In one embodiment of the present invention, the disclosed yarns can be further processed if necessary and utilized in forming secondary products including those products that in the past have been formed with previously known multifilament polyolefin yarns. For example, the disclosed yarns can be utilized in forming ropes, and woven or nonwoven fabrics such as may be found in machinery belts or hoses, roofing fabrics, geotextiles, and the like. In particular, the disclosed multifilament yarns can be suitable for use in forming a secondary product according to any known technique that has been used in the past with previously known polyolefin multifilament yarns. Due to the improved physical properties of the disclosed yarns, however, and particularly, the higher modulus and tenacity of the disclosed yarns, secondary products formed utilizing the inventive yarns can provide improved characteristics, such as strength and tenacity, as compared to similar products formed of previously known multifilament polyolefin yarns. The invention may be better understood with reference to the following Example.

EXAMPLE

Yarn samples were formed on system similar to that illustrated in FIG. 1. In particular, the system included a ¾ inch, 24:1 single screw extruder with three temperature zones, a head with a melt pump and spinneret, a liquid quench tank (40 inch length), with two rollers in the tank, a vacuum water removal system, a spin finish applicator, three heated godet rolls, a forced air oven (120 inch length) and a LEESONA® winder.

Materials utilized in forming the yarns included ATOFINA® 3462, a polypropylene homopolymer with a melt flow index of 3.7, and ATOFINA® 3281, a polypropylene homopolymer with a melt flow index of 1.3 (both available from ATOFINA Petrochemicals, Inc. of Houston, Tex.); a 10% concentrate of a nucleating agent composition, specifically MILLAD® 3988 (3,4-dimethyl dibenzylidiene sorbitol) in a 12 MFI polypropylene homopolymer (available from Standridge Color Corporation, Social Circle, Ga., USA); and a polyethylene homopolymer with a melt flow index of 12 (available from TDL Plastics, of Houston, Tex.).

Table 1, below, tabulates the formation conditions of 37 different samples including the material make-up (including the polymer used and the total weight percent of the nucleating agent in the melt), the spinneret hole size in inches, the total number of filaments extruded, the temperature of the quench water bath, the roll speeds of the drawing rolls, the total draw ratio (Roll 3/Roll 1), and the temperature of the drawing oven. In addition, as the nucleating agent is provided in a 10% concentrate composition of the nucleating agent in a 12 MFI polypropylene homopolymer, the material make-up of those samples that include an amount of a nucleating agent will also include an amount of the 12 MFI polypropylene homopolymer from the concentrate. For example, a sample that is listed as containing FINA 3462/ 0.2% Millad will contain 0.2 wt % of the nucleating agent, 1.8 wt % of the 12 MFI polypropylene homopolymer used in forming the 10% nucleating agent composition, and 98 wt % of the FINA 3462 3.7 MFI polypropylene homopolymer.

TABLE 1

| Sample | Material | Spinneret Hole Size (inches) | # Fils. | Water Temp (° C.) | Roll 1 m/min | Roll 2 m/min | Roll 3 m/min | DR | Oven T (° C.) |
|---|---|---|---|---|---|---|---|---|---|
| A | Fina 3462 | 0.04 | 1 | 25 | 11.3 | 100 | 110 | 9.7 | 120 |
| B | Fina 3462/0.2% Millad | 0.04 | 1 | 25 | 8 | 123 | 123 | 15.4 | 140 |
| C | Fina 3462/0.2% Millad | 0.027 | 17 | 25 | 5 | 30 | 30 | 6.0 | 120 |
| D | Fina 3462/0.2% Millad | 0.027 | 17 | 25 | 5 | 37.5 | 37.5 | 37.5 | 150 |
| E | Fina 3462/0.25% Millad | 0.018 | 1 | 25 | 10.5 | 135 | 135 | 12.9 | 130 |
| F | Fina 3462/0.25% Millad | 0.018 | 8 | 25 | 9 | 85 | 85 | 9.4 | 130 |
| G | Fina 3462/0.25% Millad | 0.018 | 8 | 25 | 6 | 85 | 85 | 14.2 | 130 |
| H | Fina 3462/0.25% Millad | 0.012 | 8 | 25 | 8.75 | 85 | 85 | 9.7 | 130 |
| I | Fina 3462/0.25% Millad | 0.012 | 8 | 25 | 9.5 | 85 | 85 | 8.9 | 130 |
| J | Fina 3462/0.20% Millad | 0.012 | 8 | 25 | 8 | 85 | 85 | 10.6 | 130 |
| K | Fina 3462/0.20% Millad | 0.012 | 8 | 25 | 6.25 | 85 | 85 | 13.6 | 130 |
| L | Fina 3462/0.20% Millad | 0.012 | 8 | 25 | 5.5 | 85 | 85 | 15.5 | 130 |
| M | Fina 3462/0.20% Millad | 0.012 | 8 | 25 | 5.5 | 85 | 85 | 15.5 | 130 |
| N | Fina 3462/0.20% Millad | 0.012 | 5 | 25 | 5 | 85 | 85 | 17.0 | 130 |
| O | Fina 3462/0.20% Millad | 0.012 | 5 | 55 | 6 | 85 | 85 | 14.2 | 130 |
| P | Fina 3462/0.20% Millad | 0.012 | 5 | 55 | 6 | 85 | 85 | 14.2 | 130 |
| Q | Fina 3462/0.20% Millad | 0.012 | 8 | 73 | 5.25 | 84 | 85 | 16.2 | 130 |
| R | Fina 3462/0.20% Millad | 0.012 | 8 | 85 | 5.5 | 84 | 85 | 15.5 | 130 |
| S | Fina 3462/0.20% Millad | 0.012 | 8 | 85 | 5.25 | 84 | 85 | 16.2 | 130 |
| T | Fina 3462/0.20% Millad | 0.012 | 8 | 82 | 4.75 | 84 | 85 | 17.9 | 145 |
| U | Fina 3462/0.20% Millad | 0.012 | 8 | 82 | 4.6 | 84 | 85 | 18.5 | 150 |
| V | Fina 3281/0.2% Millad | 0.012 | 8 | 75 | 4.5 | 84 | 85 | 18.9 | 140 |
| W | Fina 3281/0.2% Millad | 0.012 | 8 | 75 | 4.5 | 84 | 85 | 18.9 | 140 |
| X | Fina 3281 | 0.012 | 8 | 75 | 6 | 84 | 85 | 14.2 | 130 |
| Y | Fina 3281 | 0.012 | 8 | 75 | 4.5 | 84 | 85 | 18.9 | 140 |
| Z | Fina 3281 | 0.012 | 8 | 75 | 4.25 | 84 | 85 | 20.0 | 140 |
| AA | Fina 3281 w/ 5% 12MFI PE | 0.012 | 8 | 75 | 5 | 84 | 85 | 17.0 | 130 |
| BB | Fina 3281/0.2% Millad | 0.012 | 8 | 75 | 4.75 | 84 | 85 | 17.9 | 150 |
| CC | Fina 3281/0.2% Millad | 0.012 | 8 | 75 | 4.25 | 84 | 85 | 20.0 | 140 |
| DD | Fina 3281/0.2% Millad | 0.012 | 8 | 75 | 4 | 84 | 85 | 21.3 | 140 |
| EE | Fina 3281/0.2% Millad | 0.012 | 8 | 75 | 4 | 84 | 85 | 21.3 | 140 |
| FF | Fina 3281/0.2% Millad | 0.012 | 8 | 75 | 4 | 84 | 85 | 21.3 | 140 |
| GG | Fina 3281/0.2% Millad | 0.012 | 8 | 75 | 5 | 84 | 85 | 17.0 | 140 |
| HH | Fina 3281/0.2% Millad | 0.012 | 8 | 75 | 4.75 | 84 | 85 | 17.9 | 140 |
| II | Fina 3281/0.2% Millad | 0.012 | 20 | 75 | 4.25 | 84 | 85 | 20.0 | 140 |
| JJ | Fina 3281/0.2% Millad | 0.012 | 20 | 75 | 5.5 | 84 | 85 | 15.5 | 150 |
| KK | Fina 3281/0.2% Millad | 0.012 | 20 | 75 | 4.25 | 84 | 85 | 20.0 | 140 |

Following formation, the samples were tested for a number of physical properties including denier, denier per filament, elongation, tenacity, modulus, and toughness, all according to ASTM D2256-02, previously incorporated by reference. Results are shown below in Table 2.

TABLE 2

| Sample | Material | Denier g/9000 m | Denier/fil g/9000 m | Elong % | Ten g/d | Mod g/d | Toughness g/d |
|---|---|---|---|---|---|---|---|
| A | Fina 3462 | 302 | 302 | 24 | 5.2 | 60 | |
| B | Fina 3462/0.2% Millad | 292 | 292 | 8 | 5.9 | 107 | |
| C | Fina 3462/0.2% Millad | 1300 | 76 | 21 | 5.5 | 50 | |
| D | Fina 3462/0.2% Millad | 1414 | 83 | 16 | 4.2 | 43 | |
| E | Fina 3462/0.25% Millad | 63 | 63 | 10 | 7.9 | 125 | |
| F | Fina 3462/0.25% Millad | 293 | 37 | 22 | 8.5 | | |
| G | Fina 3462/0.25% Millad | 532 | 67 | 11.7 | 10.4 | 173 | |
| H | Fina 3462/0.25% Millad | 210 | 26 | 16.9 | 8.1 | 100 | |
| I | Fina 3462/0.25% Millad | 161 | 20 | 14.8 | 7.2 | 100 | |
| J | Fina 3462/0.20% Millad | 222 | 28 | 15.0 | 9.0 | 108 | |
| K | Fina 3462/0.20% Millad | 316 | 40 | 9.1 | 8.4 | 154 | |
| L | Fina 3462/0.20% Millad | 362 | 45 | 8.9 | 8.8 | 159 | |
| M | Fina 3462/0.20% Millad | 420 | 53 | 11.2 | 9.6 | 146 | |
| N | Fina 3462/0.20% Millad | 297 | 59 | 10.4 | 10.5 | 171 | |
| O | Fina 3462/0.20% Millad | 287 | 57 | 11.3 | 9.4 | 144 | |
| P | Fina 3462/0.20% Millad | 276 | 55 | 9.2 | 7.7 | 132 | |
| Q | Fina 3462/0.20% Millad | 406 | 51 | 9.3 | 11.6 | 207 | |
| R | Fina 3462/0.20% Millad | 369 | 46 | 14.0 | 8.2 | | |
| S | Fina 3462/0.20% Millad | 390 | 49 | 14.0 | 8.4 | | |
| T | Fina 3462/0.20% Millad | 345 | 43 | 9.3 | 10.4 | 189 | |
| U | Fina 3462/0.20% Millad | 324 | 41 | 8.8 | 10.9 | 201 | |
| V | Fina 3281/0.2% Millad | 353 | 44 | 7.3 | 9.3 | 185 | |
| W | Fina 3281/0.2% Millad | 358 | 45 | 6.9 | 9.7 | 203 | |
| X | Fina 3281 | 329 | 41 | 12.5 | 9.3 | 131 | 0.75 |
| Y | Fina 3281 | 301 | 38 | 10.7 | 10.3 | 160 | 0.73 |

TABLE 2-continued

| Sample | Material | Denier g/9000 m | Denier/fil g/9000 m | Elong % | Ten g/d | Mod g/d | Toughness g/d |
|---|---|---|---|---|---|---|---|
| Z | Fina 3281 | 316 | 40 | 9.7 | 9.8 | 165 | 0.66 |
| AA | Fina 3281 w/ 5% 12MFI PE | 328 | 41 | 14.0 | 8.9 | | |
| BB | Fina 3281/0.2% Millad | 270 | 34 | 9.1 | 8.5 | 159 | 0.62 |
| CC | Fina 3281/0.2% Millad | 287 | 36 | 8.6 | 8.9 | 181 | 0.58 |
| DD | Fina 3281/0.2% Millad | 265 | 33 | 8.9 | 10.4 | 203 | 0.68 |
| EE | Fina 3281/0.2% Millad | 364 | 46 | 8.1 | 9.1 | 178 | 0.61 |
| FF | Fina 3281/0.2% Millad | 403 | 50 | 6.5 | 8.5 | 181 | 0.41 |
| GG | Fina 3281/0.2% Millad | 356 | 45 | 8.4 | 10.3 | 200 | 0.60 |
| HH | Fina 3281/0.2% Millad | 375 | 47 | 5.3 | 8.8 | 203 | 0.39 |
| II | Fina 3281/0.2% Millad | 396 | 20 | 6.4 | 8.3 | 178 | 0.46 |
| JJ | Fina 3281/0.2% Millad | 589 | 29 | 9.6 | 9.2 | 166 | 0.65 |
| KK | Fina 3281/0.2% Millad | 423 | 21 | 6.1 | 7.8 | 178 | 0.47 |

X-Ray Scattering Analysis

The samples were studied by small angle x-ray scattering (SAXS). The SAXS data were collected on a Bruker AXS (Madison, Wis.) Hi-Star multi-wire detector placed at a distance of 105.45 cm from the sample in an Anton-Paar vacuum. X-rays ($\lambda=0.154178$ nm) were generated with a MacScience rotating anode (40 kV, 40 mA) and focused through three pinholes to a size of 0.2 mm. The entire system (generator, detector, beampath, sample holder, and software) is commercially available as a single unit from Bruker AXS. The detector was calibrated per manufacturer recommendation using a sample of silver behenate.

A typical SAXS data collection was conducted as follows: a polypropylene filament bundle was wrapped around a holder, which was placed in the x-ray beam inside an Anton-Paar vacuum sample chamber on the x-ray equipment. The sample chamber and beam path was evacuated to less than 100 mTorr and the sample was exposed to the X-ray beam for between about 45 minutes and one hour. Two-dimensional data frames were collected by the detector and unwarped automatically by the system software.

An analysis of the scattered intensity distribution) ($2\theta=0.2°\ 2.5°$ into the equatorial or meridonal directions was calculated from the raw data frames by dividing the scattering into 2 regions: an equatorial scattering region, integrated from $2\theta$ of between about 0.4 to about 1.0 and $\phi$ from about 60 to about 120 and from about 240 to about 300 (zero $\phi$ being parallel to the yarn, or vertical in FIG. 4), and the meridonal scattering region, integrated from 28 of between about 0.4 and about 1.0 and b from about −60 to about 60 and from about 120 to about 240. Total counts were summed for each of the two regions and the ratio calculated and tabulated for each sample in Table 3, below.

TABLE 3

| Sample | Material | Meriodional Scattering counts | Equatorial Scattering counts | Equatorial/Meridional |
|---|---|---|---|---|
| A | Fina 3462 | 150499 | 18174 | 0.12 |
| B | Fina 3462/0.2% Millad | 83716 | 293818 | 3.51 |
| C | Fina 3462/0.2% Millad | 125348 | 20722 | 017 |
| D | Fina 3462/0.2% Millad | 169657 | 37642 | 0.22 |
| E | Fina 3462/0.25% Millad | 57067 | 265606 | 4.65 |
| F | Fina 3462/0.25% Millad | 28192 | 23494 | 0.83 |
| G | Fina 3462/0.25% Millad | 34164 | 182207 | 5.33 |
| H | Fina 3462/0.25% Millad | 14203 | 11505 | 0.81 |
| I | Fina 3462/0.25% Millad | 21722 | 17758 | 082 |
| J | Fina 3462/0.20% Millad | 36264 | 74971 | 2.07 |
| K | Fina 3462/0.20% Millad | 82734 | 662846 | 8.01 |
| L | Fina 3462/0.20% Millad | 47815 | 175599 | 3.67 |

TABLE 3-continued

| Sample | Material | Meriodional Scattering counts | Equatorial Scattering counts | Equatorial/Meridional |
|---|---|---|---|---|
| M | Fina 3462/0.20% Millad | 53247 | 323136 | 6.07 |
| N | Fina 3462/0.20% Millad | 89254 | 561719 | 6.29 |
| O | Fina 3462/0.20% Millad | 52212 | 313477 | 6.00 |
| P | Fina 3462/0.20% Millad | 57344 | 365467 | 6.37 |
| Q | Fina 3462/0.20% Millad | 107220 | 401479 | 3.74 |
| R | Fina 3462/0.20% Millad | 40419 | 59163 | 1.46 |
| S | Fina 3462/0.20% Millad | 48712 | 106876 | 2.19 |
| T | Fina 3462/0.20% Millad | 49098 | 153474 | 3.13 |
| U | Fina 3462/0.20% Millad | 65459 | 210907 | 3.22 |
| V | Fina 3281/0.2% Millad | 54222 | 220056 | 4.06 |
| W | Fina 3281/0.2% Millad | 43058 | 257097 | 5.97 |
| X | Fina 3281 | 53060 | 159811 | 3.01 |
| Y | Fina 3281 | 57218 | 210615 | 3.68 |
| Z | Fina 3281 | 45224 | 186045 | 4.11 |
| AA | Fina 3281 w/5% 12MFI PE | 35826 | 87938 | 2.45 |
| BB | Fina 3281/0.2% Millad | 37907 | 98972 | 2.61 |
| CC | Fina 3281/0.2% Millad | 54109 | 164494 | 3.04 |
| DD | Fina 3281/0.2% Millad | 47656 | 202256 | 4.24 |
| EE | Fina 3281/0.2% Millad | 51026 | 171581 | 3.36 |
| FF | Fina 3281/0.2% Millad | 48872 | 181346 | 3.71 |
| GG | Fina 3281/0.2% Millad | 49382 | 282525 | 5.72 |
| HH | Fina 3281/0.2% Millad | 54467 | 348671 | 6.40 |
| II | Fina 3281/0.2% Millad | 57703 | 260487 | 4.51 |
| JJ | Fina 3281/0.2% Millad | 52353 | 178923 | 3.42 |
| KK | Fina 3281/0.2% Millad | 46881 | 203281 | 4.34 |

As can be seen with reference to Table 3, while the disclosed materials can in some cases give to rise to a SAXS scattering profile with both meridonal scattering and equatorial scattering, the meridonal scattering is low compared to the highly unique strong equatorial scattering giving rise to a high ratio of equatorial scattering to meridonal scattering. At the very least, then, the presence of intense scattering wings in the equatorial direction provides the desired crystal structures that impart the properties of high tenacity and high modulus found in the multifilament yarns.

Microstructural Analysis

Example JJ from above was further analyzed to make a determination as to further explanations for the significantly high modulus strength, high tenacity, and other results noted above. As well, high temperature shrinkage rates were studied in relation to such inventive fibers.

As noted above, the actual appearance of the inventive fibers, under Scanning Electron Microscopy (SEM), at least, is unique for synthetic fibers, let alone for polyolefin or polypropylene types. As presented in FIG. 5, the microphotograph image shows clear striations visible externally and in relatively uniform repetitive formation throughout the inventive fibers. Notable also in this photomicrograph are significant numbers of voids. With transparent fibers, such internally present voids (a/k/a cracks) can be clearly viewed from this perspective. As discussed previously, such voids apparently cause the low density measurements exhibited by such inventive fibers. As measured by the Brunauer, Eller and Teller method (BET), the presence of such a significant number of voids results in an unusually high surface area (roughly 1.5 $m^2/g$) which is itself about eighteen times higher than would be expected from a void-free fiber of equal diameter and customary 0.93 $g/cm^3$ density.

Figure 6:
FIG. 6 provides two separate cross-sections (one at 90° and the other at 45°) under SEM of inventive polypropylene fibers.

FIG. 6 shows two different cross section SEM photomicrographs of an inventive fiber (Example JJ, again) and the presence of a network of interconnected channels throughout the entire fiber. A large number of such voids are clearly present (thus, again, causing the apparent reduction in overall fiber density with increased surface area) and it would be expected that that such cracks would not impart anything but a weakened fiber structure. Of great interest, then, was trying to understand how such internal and surface area-increasing voids would not lead to a weakening, rather than the resultant strengthening of the fiber, particularly to levels of modulus strength in excess of 100 g/d (~8 GPa).

Figure 5:
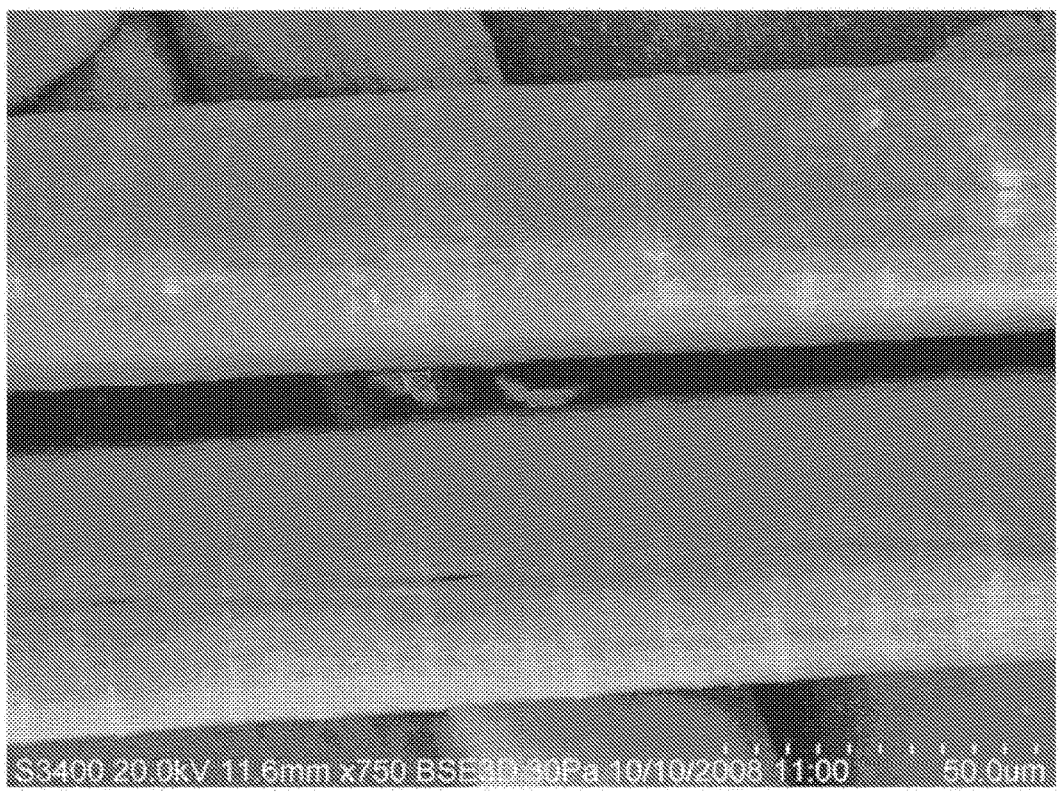
FIG. 5 shows a Scanning Electron Microscope (SEM) view of the surface of the inventive polypropylene fibers.
Figure 7:
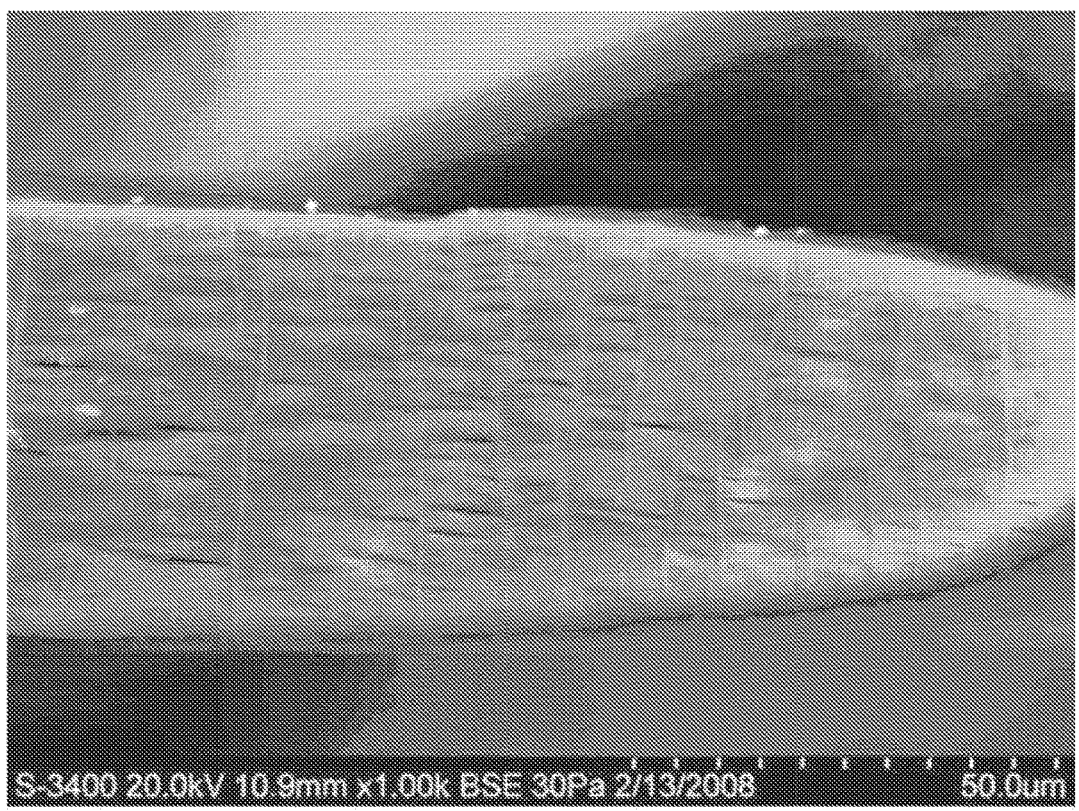
FIG. 7 shows a cross-sectional SEM view at 1,000× magnification of an inventive polypropylene fiber.

FIG. 7 provided a very surprising result in terms of the internal fiber structure from a cross-sectional view; clearly the striations present on the external surface of the fiber (such as seen in FIG. 5) are also present internally and, again, in substantially uniform repetitive formation (in this instance, measured at roughly 1 micron apart throughout the length of the viewed portion of the fiber). Under analysis by Atomic Force Microscopy (AFM), it was noted that such striations do not simply exist and appear within the transparent fibers, but such phenomena actually extend outwardly from the fiber surface as well (from about 100 to 300 nm in distance therefrom). Additionally, FIG. 7 intervals of roughly 1 micron distance between the striations (on average, apparently).

Figure 8:
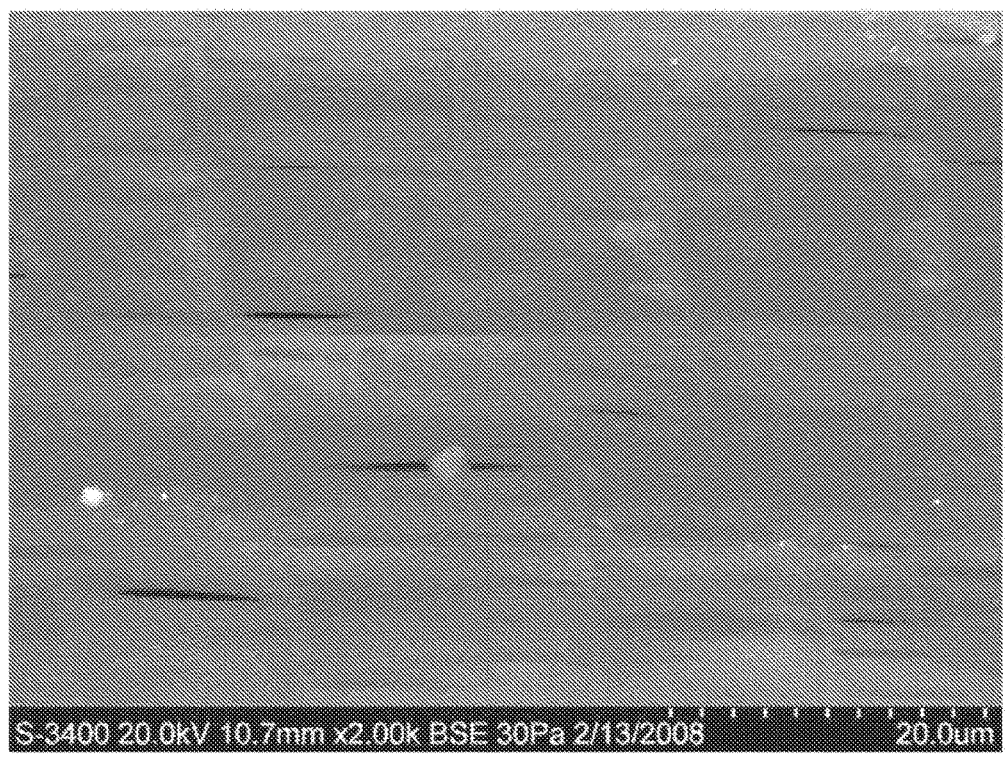
FIG. 8 shows a cross-sectional SEM view at 2,000× magnification of an inventive polypropylene fiber.

Within both FIGS. 7 and 8, the presence of the aforementioned voids is noticeable and distinct, both in number and direction (longitudinal to the fiber direction). These voids are within low intensity crystalline regions of the fiber, indicating, it is believed, without relying upon any specific scientific theory, that such void regions comprise extended-chain microfibrillar structures and the voids propagate between adjacent microfibrils throughout the entire fiber itself. Such microfibrils are clearly seen in FIG. 7, as well as such adjacent voids. It is further believed, again, without relying upon any specific scientific theory, that the high intensity regions of crystalline formation, notably the striations discussed previously, provide a mechanism for preventing further crack propagation within the fiber structure. In essence, the apparent disk-shaped (more pointedly, substantially disk-shaped) striations (the disk-like appearance is extrapolated from the cross-section view in FIG. 7, at least, as it appears that such striations are present throughout the entire fiber in the repeating formations as noted above. As this is a substantially round fiber, it is noted that the results would be expected in like fashion if the fiber were of different geometrical shape), being of high intensity crystalline regions, and spaced in a substantial uniform periodic formation, provide a resistance to crack propagation within such high intensity regions. As such, it is theorized that these unique striations, being present substantially (at least) throughout the inventive fiber in periodic form and in substantially disk-shaped configuration impart the necessary prevention of further void/crack formation within the inventive fiber, thereby allowing the reduction in density, but with simultaneous increase in overall fiber strength. To date, such an appearance within a synthetic multifilament fiber, not to mention a result of a reduced density with very high modulus strength, has not been available.

Furthermore, the microfibrils (FIG. 7, at least) appear to be present throughout the high and low intensity crystalline regions of the inventive fibers as well. Such microfibrils have been measured to exhibit diameters within an approximate range of from 30 to 80 nm. Such a result is noted in FIG. 8, particularly with the clear distinction between the repeated striations (that extend throughout the fiber in some places, but clearly provide a crack prevention mechanism, at the very least, within the internal regions of the inventive fiber). The connections between adjacent microfibrils most likely lend themselves to the crack resistant properties of the inventive fibers as well as the presence of the striations noted above. It may be possible that the striations are actually the result of highly crystalline regions of crystalline bridges, possibly in the form of chain-folded lamellae, wherein the microfibrils are manipulated during the high drawing procedure with the subsequent cooling and heat-setting. In any event, it is evident that the cracks/voids within the inventive fiber are present within low intensity crystalline regions and the striations themselves are distinctly high intensity regions. In such a configuration, the lack of interfering amorphous regions within the inventive fiber lends itself to the resultant SAXS and WAXS measurements noted above in that the resultant values for each analysis comports with the theoretical arrangement of microfibrils, voids, and striations as put forth herein.

Figure 9:
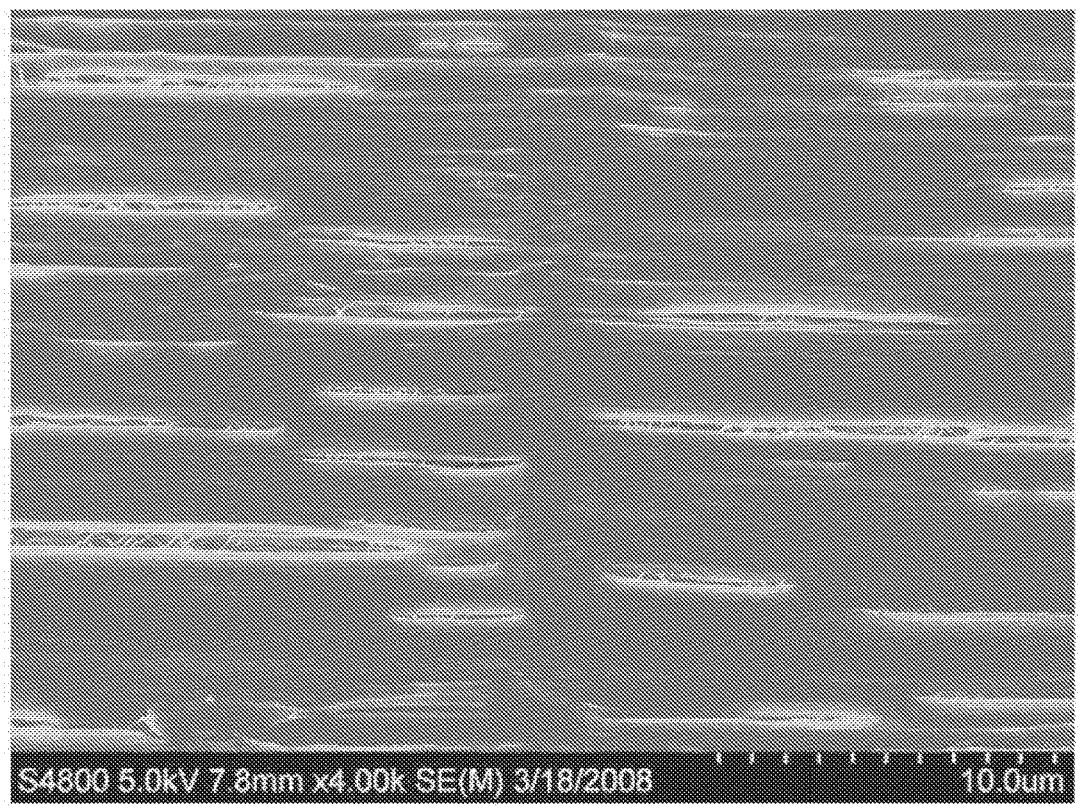
FIG. 9 shows a cross-sectional SEM view at 4,000× magnification of an inventive fiber, particularly showing nanofilament bridges spanning voids (or cracks)
Figure 10:
FIG. 10 shows a cross-sectional SEM view at 30,000× magnification of an inventive fiber, showing in greater detail the nanofilament bridges of FIG. 10.

Further analysis in terms of other possible microstructures within the inventive fiber were undertaken as well. FIG. 9 provides a 4,000× magnification of a cross-section of such a fiber (Example JJ, as above) and yields even more unexpected results. Most notably very small "cross-linking" constituents are clearly viewed within the void spaces of such a fiber. These constituents are referred to here as "nanofilament bridges" due to their noticeably microscopic size (nanoscopic, as it were) and the clear appearance that such constituents are present in substantially perpendicular relation to the voids and adjacent microfibrils (that run in the fiber's longitudinal direction, in essence). FIG. 10 provides an even closer view of such nanofilament bridges as they appear in relatively high number throughout the voids of the inventive fiber. Such a resultant configuration has never been seen within synthetic fibers, much less polyolefin or, further, polypropylene, fibers. Although it is not possible to determine if such nanofilament bridges contribute to the overall high modulus strength of the inventive fibers, the appearance of such constituents is certainly unique to polyolefin fibers, at least. Without intending to be bound to any specific scientific theory, again, it is surmised that such nanofilament bridges would provide some degree of modulus strength impartation by reducing the propensity of the adjacent microfibrils from moving in a fashion that would permit notching of surface deformations and thus rupture of the microfibrils during tensioning.

Such a potential rationale for nanofilament bridge contribution is possible for a number of reasons. Importantly, however, the actual tensile failure potential for these inventive fibers (exhibiting modulus strengths of at least 40 g/d, preferably at least 100 g/d) appears to rely primarily on axial splitting, rather than, as noted above, fiber fracturing through notching, stress concentration and elongation thereafter leading to catastrophic failure. Typical polyolefin fibers exhibit a lack of dimensional stability once a surface deformation is present. Once such a flaw exists, as noted above, the continued stresses on the subject fiber invariably lead to a relatively clean break between distinct retained fiber portions (i.e., a cylindrical fiber is split into two separate cylindrical fibers).

Figure 11:
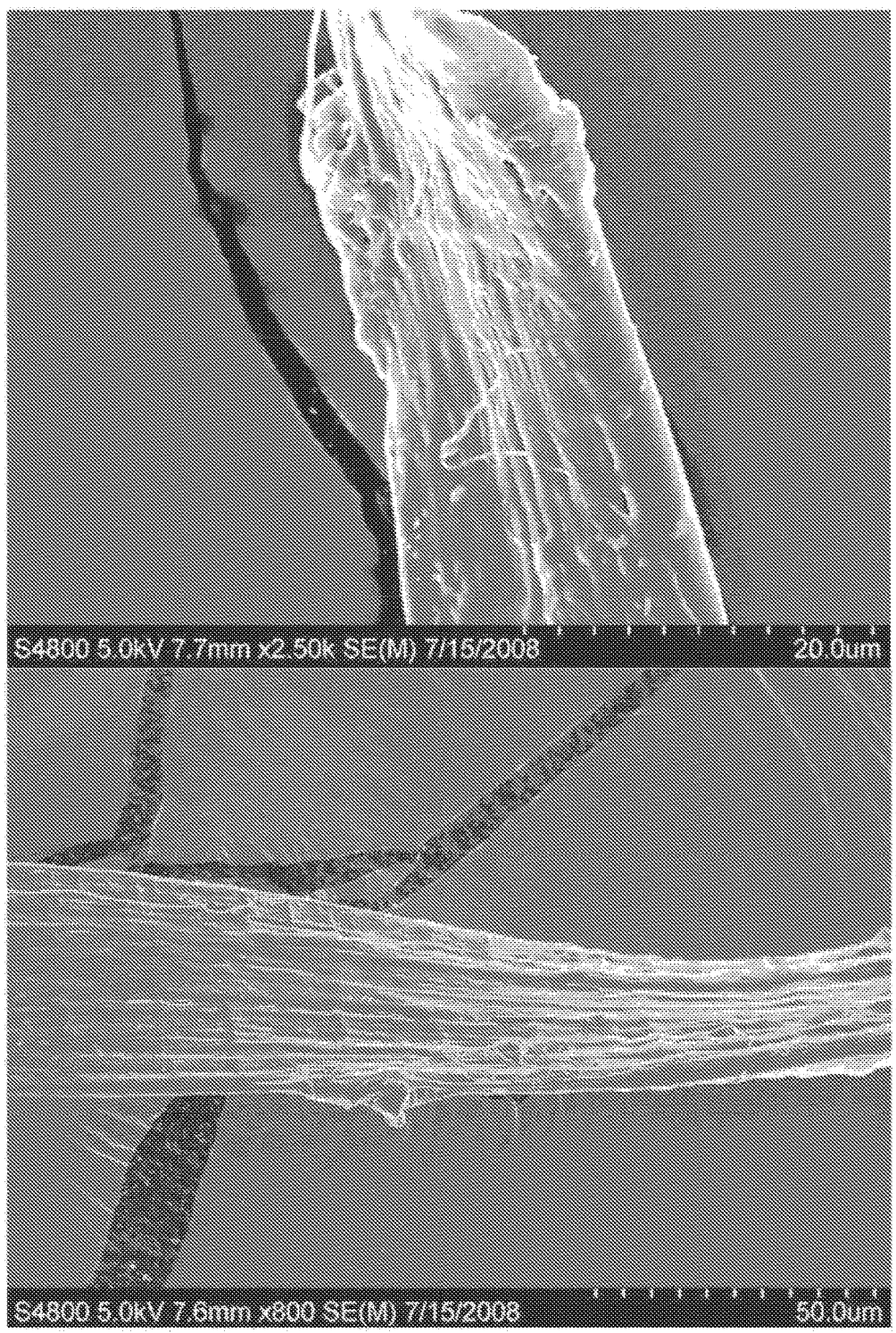
FIG. 11 shows two aerial SEM views at 800× and 2,500× magnification, respectively, of the fracture morphology of inventive polypropylene fibers.

To the contrary, with the highly oriented crystalline fibers of the invention, the capability of generating surface deformations that lead to ductile fracture are drastically reduced. In actuality, the failure of such fibers is more easily accomplished through axially applied shear stresses as opposed to notching. FIG. 11 shows axially split inventive fibers after tensile loading has been applied to the breaking point in relation to such shear stresses. The typical breakage possibilities are difficult to create with such fibers. Such shear stresses apparently function to create fiber fracture due to the eventual excessive shear application that overcomes the cohesive forces between the polyolefin molecules within the fiber. At that point, which is well above a level of typical lower density polyolefin fibers, on par with polyaramid and/or ultra-high molecular weight polyethylene ethylene, for example, failure mechanism would be caused by the ability of cracks/voids to propagate and reach the fiber surface, thereby causing rupture. Again, as the level of shear stresses necessary to reach this result is extremely high, the capability of such inventive fibers to withstand typical fracture mechanisms and fail upon application of incredibly high shear stresses provides a highly unique low density polyolefin fiber, the likes of which there has been nothing heretofore provide the industry.

Figure 12:
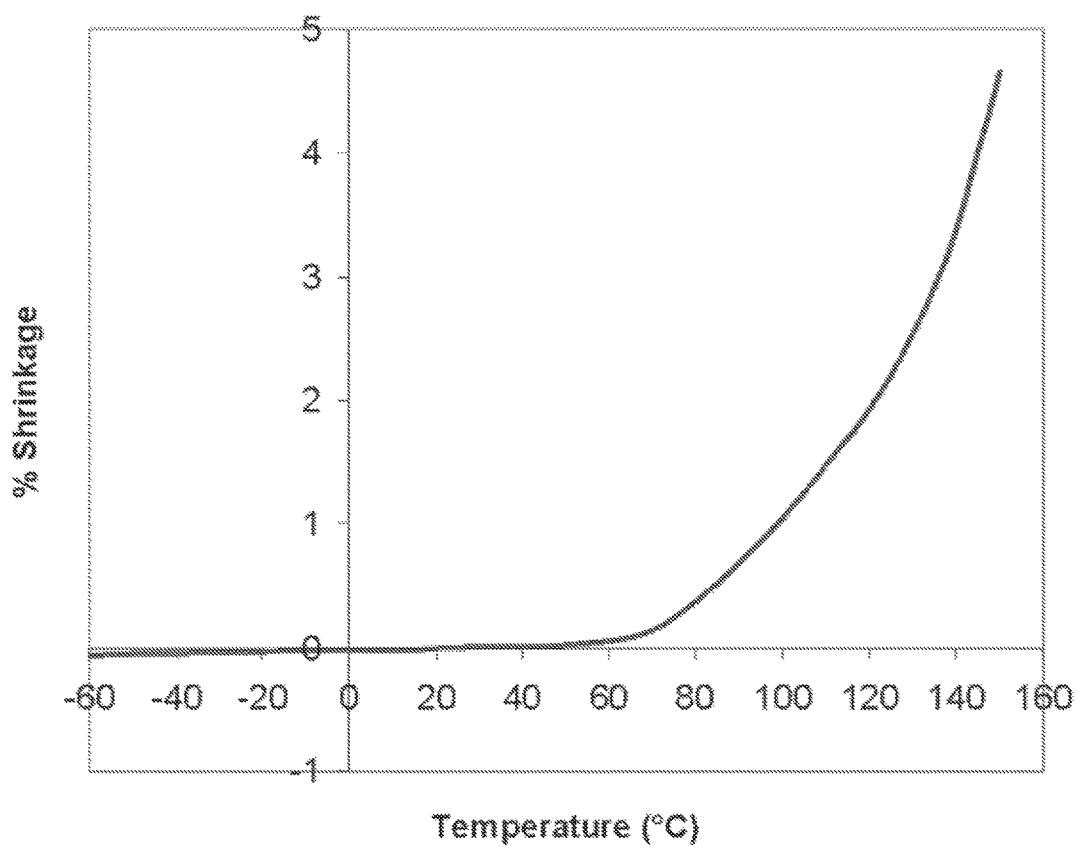
FIG. 12 is a graphical representation of the shrinkage rate of an inventive polypropylene fiber.

The utilization of such a unique synthetic fiber has been discussed above. In addition to the modulus strength (high), elongation measurements (very low), surface area (very high) and overall measured density (very low), high temperature dimensional stability was also analyzed. Thermal shrinkage was measured by placing a fiber of set length within a hot air oven and monitoring the potential length reduction as the temperature is gradually increased. Conventional spun-drawn polypropylene multifilament fibers typically exhibit a shrinkage rate of about 30% at a temperature of 150° C. As seen in FIG. 12, the inventive polypropylene melt-spun/drawn multifilament fiber (Example JJ) exhibits a shrinkage rate far below that level (less than 5%) for that temperature. In fact, at 70° C., the inventive fiber shows negligible, if any, shrinkage characteristics. In comparison, the literature regarding SPECTRA® ultra high molecular weight polyethylene fibers indicates shrinkage rates of 23% for the 900 series and 9% for the 1000 series, at 143° C.

Figure 13:
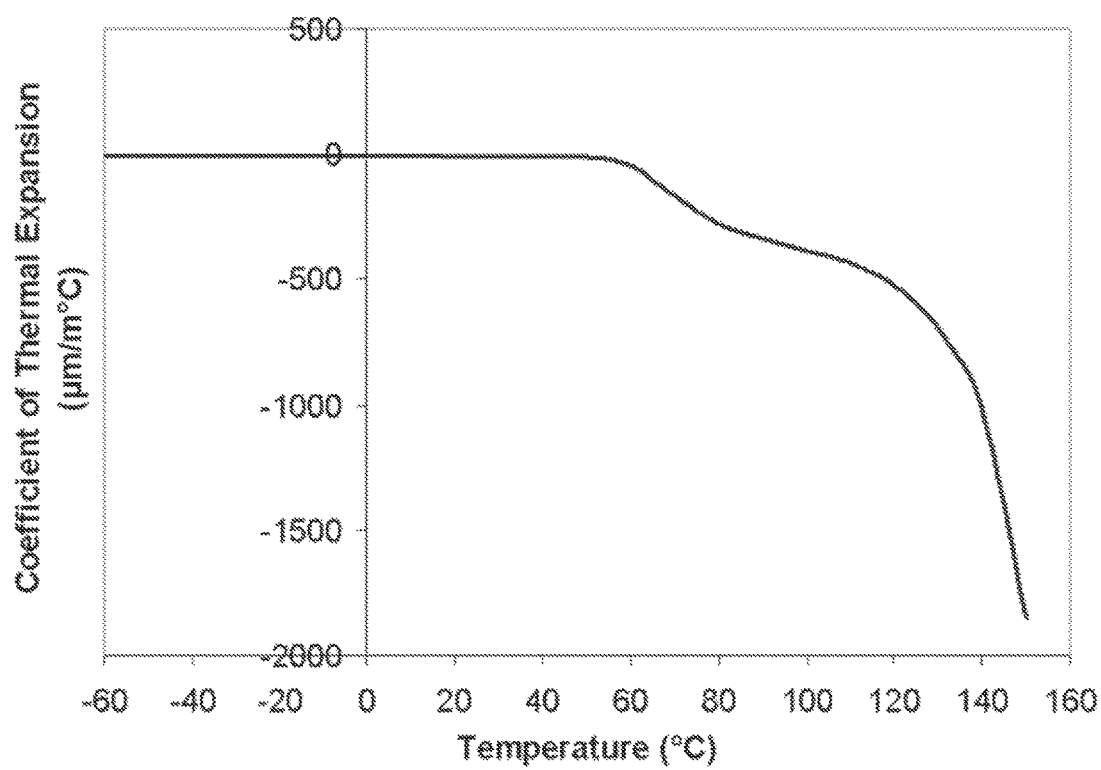
FIG. 13 is a graphical representation of the coefficient of thermal expansions exhibited by a typical inventive polypropylene fiber.

The axial coefficient of thermal expansion for the inventive fiber (Example JJ, at least) is plotted in FIG. 13. An initially static plateau exists for an exceedingly large range of temperatures, with a relatively minor slope effect downward for another large range of temperatures, with a final rapid drop off once the temperature exceeds .about 120° C. Such a coefficient signature is, as with everything else described above, unique to the inventive polyolefin fiber produced through the specific melt spun-drawn method described herein.

It will be appreciated that the foregoing examples, given for purposes of illustration, are not to be construed as limiting the scope of this invention. Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention that is defined in the following claims and all equivalents thereto. Further, it is recognized that many embodiments may be conceived that do not achieve all of the advantages of some embodiments, yet the absence of a particular advantage shall not be construed to necessarily mean that such an embodiment is outside the scope of the present invention.

What is claimed is:

1. A polyolefin multifilament fiber exhibiting repeated multiple striations therein, said striations being aligned substantially perpendicularly along the longitudinal axis of said fiber, wherein said striations extend outwardly from the surface of said fiber and wherein at least a portion of said striations extend internally within said fiber toward the longitudinal axis of said fiber, and wherein said internally extending striations define longitudinally extending voids between said striations; and, wherein said fiber has a ratio of equatorial intensity to meridional intensity greater than about 1.0 according to small angle x-ray scattering measuring techniques.

2. The polyolefin fiber of claim 1, wherein said polyolefin is selected from the group consisting of a polypropylene, a polyethylene, and any blends thereof.

3. The polyolefin fiber of claim 2, wherein said polyolefin is a polypropylene.

4. The polyolefin fiber of claim 3, wherein said fiber exhibits a modulus strength of at least 8 GPa.

5. The polyolefin fiber of claim 1, wherein said fiber exhibits a modulus strength of at least 8 GPa.

6. A polyolefin multifilament fiber exhibiting a modulus strength of at least 8 GPa with a fiber diameter of at most 100 microns and further possessing greater than about 80% crystallinity as measured by wide angle X-ray scattering, said fiber internally comprising a plurality of microfibrils therein, wherein said fiber further exhibits a plurality of voids interspersed within said microfibrils, wherein both said microfibrils and said voids are aligned substantially parallel to the longitudinal axis of said fiber.

7. The polyolefin fiber of claim 6, wherein said polyolefin is selected from the group consisting of a polypropylene, a polyethylene, and any blends thereof.

8. The polyolefin fiber of claim 7, wherein said polyolefin is a polypropylene.

9. A polyolefin multifilament fiber exhibiting a modulus strength of at least 8 GPa with a fiber diameter of at most 100 microns and a surface area of about 1.5 m2/g, said fiber further exhibiting voids therein, wherein said voids exhibit include a plurality of nanofilament bridges therein, said nanofilament bridges being substantially perpendicular to a longitudinal axis of said fiber.

10. The polyolefin fiber of claim 9, wherein said polyolefin is selected from the group consisting of a polypropylene, a polyethylene, and any blends thereof.

11. The polyolefin fiber of claim 10, wherein said polyolefin is a polypropylene.

12. A polyolefin multifilament fiber exhibiting a shear stress tensile failure mechanism at a level less than a ductile fracture tensile failure mechanism, the fiber possessing greater than about 80% crystallinity as measured by wide angle X-ray scattering and said fiber further exhibits a plurality of voids interspersed within an inner region.

13. The polyolefin fiber of claim 12, wherein said polyolefin is selected from the group consisting of a polypropylene, a polyethylene, and any blends thereof.

14. The polyolefin fiber of claim 13, wherein said polyolefin is a polypropylene.

15. The polyolefin fiber of claim 12, wherein said fiber exhibits a modulus strength of at least 8 GPa.

16. A polyolefin multifilament fiber exhibiting a modulus strength of at least 8 GPa with a fiber diameter of at most 100 microns, where said fiber exhibits a hot air shrinkage of less than 5% at 150° C. and greater than 80% crystallinity as measured by wide angle x-ray scattering and said fiber further exhibits a plurality of voids interspersed within an inner region.

17. The polyolefin fiber of claim 16, wherein said polyolefin is selected from the group consisting of a polypropylene, a polyethylene, and any blends thereof.

18. The polyolefin fiber of claim 17, wherein said polyolefin is a polypropylene.

\* \* \* \* \*